(12) United States Patent
Karyappa et al.

(10) Patent No.: US 11,882,847 B2
(45) Date of Patent: Jan. 30, 2024

(54) CHOCOLATE-BASED INK THREE-DIMENSIONAL PRINTING

(71) Applicant: Singapore University of Technology and Design, Singapore (SG)

(72) Inventors: Rahul Karyappa, Singapore (SG); Michinao Hashimoto, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 532 days.

(21) Appl. No.: 16/907,372

(22) Filed: Jun. 22, 2020

(65) Prior Publication Data

US 2021/0076700 A1    Mar. 18, 2021

(30) Foreign Application Priority Data

Sep. 17, 2019    (SG) .......................... 10201908631Q

(51) Int. Cl.
| | |
|---|---|
| A23G 1/00 | (2006.01) |
| A23P 20/20 | (2016.01) |
| A23G 1/50 | (2006.01) |
| A23G 1/32 | (2006.01) |
| A23G 1/20 | (2006.01) |
| A23P 30/20 | (2016.01) |
| B33Y 30/00 | (2015.01) |
| B33Y 70/00 | (2020.01) |
| A23P 20/25 | (2016.01) |
| B33Y 10/00 | (2015.01) |

(52) U.S. Cl.
CPC .............. *A23G 1/005* (2013.01); *A23G 1/20* (2013.01); *A23G 1/32* (2013.01); *A23G 1/50* (2013.01); *A23P 20/20* (2016.08); *A23P 30/20* (2016.08); *A23P 2020/253* (2016.08); *A23V 2002/00* (2013.01); *B33Y 10/00* (2014.12); *B33Y 30/00* (2014.12); *B33Y 70/00* (2014.12)

(58) Field of Classification Search
None
See application file for complete search history.

(56) References Cited

U.S. PATENT DOCUMENTS 9,215,882 B2 * 12/2015 Zimmerman ............ A23G 1/50

FOREIGN PATENT DOCUMENTS

CN    104543269    *    4/2015

OTHER PUBLICATIONS

Sean, 3D printer extruding icing for decorating cakes, https://www.3ders.org/articles/20120616-3d-printer-extruding-icing-for-decorating-cakes.html (Year: 2012).*

(Continued)

*Primary Examiner* — Donald R Spamer
*Assistant Examiner* — Lela S. Davis

(57) ABSTRACT

An edible and 3D printable ink composition is disclosed herein, which includes a chocolate-based material including a chocolate syrup, a chocolate paste, or a combination thereof, and cocoa powder present in an amount ranging from 5 to 25 w/w %, wherein the edible and 3D printable ink composition is both printable and remains in a single phase at a temperature ranging from 20° C. to 30° C. A method of 3D printing the edible and 3D printable ink composition, and a system operable for printing the edible and 3D printable ink composition, are also disclosed herein.

12 Claims, 21 Drawing Sheets

(56) References Cited

OTHER PUBLICATIONS

Chu Yin Huang, Extrusion-based 3D Printing and Characterization of Edible Materials (Year: 2018).*
Yang, Wenrong et al., "Carbon Nanomaterials in Biosensors: Should You Use Nanotubes or Graphene?", Angewandte Chemie International Edition, Mar. 2010, pp. 2114-2138, 49(12), Wiley-VCH Verlag GmbH & Co. KGaA.
Farahani, Rouhollah Dermanaki et al., "Direct-write fabrication of freestanding nanocomposite strain sensors", Nanotechnology, 2012, 10 pages, vol. 23.
Karageorgiou, Vassilis et al., "Porosity of 3D biomaterial scaffolds and osteogenesis", Sep. 2005, pp. 5474-5491, vol. 26, Issue 27.
Hanson Shepherd, Jennifer N. et al., "3D Microperiodic Hydrogel Scaffolds for Robust Neuronal Cultures", Advanced Functional Materials, Jan. 2011, 14 pages, vol. 21, Issue 1.
Thierrault, Daniel et al., "Fugitive Inks for Direct-Write Assembly of Three-Dimensional Microvascular Networks", Advanced Materials, Feb. 2005, pp. 395-399, vol. 17, Issue 4.
Voon, Siew Li et al., "3D food printing: a categorised review of inks and their development", Virtual and Physical Prototyping, Apr. 2019, pp. 1-16, vol. 14, Issue 3.
Wu, Willie et al., "Omnidirectional Printing of 3D Microvascular Networks", Advanced Materials, 2011, pp. H178-H183, , vol. 23, Issue 24, WILEY-VCH Verlag GmbH & Co. KGaA.
Tan, Cavin et al., "Extrusion-based 3D food printing—Materials and machines", Journal of Bioprinting, 2018, 13 pages, International , vol. 4, Issue 2.
Sun, Jie et al., "3D food printing—An innovative way of mass customization in food fabrication", Emerging Technologies in Food Science, 2015, pp. 273-287, vol. 1, Issue 1.
Huang, Chu Yin, "Extrusion-based 3D Printing and Characterization of Edible Materials", 2018, 107 pages, Waterloo, Ontario, Canada.
Godoi, Fernanda C., "3d Printing Technologies Applied for Food Design: Status and Prospects", Journal of Food Engineering, Jun. 2016, pp. 44-54, vol. 179.
Lipton, Jeffrey I., "Printable food: the technology and its application in human health", Current Opinion in Biotechnology, Apr. 2017, pp. 198-201, vol. 44.
Hao, L. et al., "Material characterisation and process development for chocolate additive layer manufacturing", Virtual and Physical Prototyping, Jun. 2010, pp. 57-64, vol. 5, Issue 2.
Dankar, Iman et al., "3D printing technology: The new era for food customization and elaboration", Trends in Food Science & Technology, 2018, pp. 231-242, vol. 75.
Beckett, Stephen T., "The Science of Chocolate", 2nd Edition, 2008, 252 pages, The Royal Society of Chemistry, Cambridge, UK.
Windhab, Erich J., "What makes for smooth, creamy chocolate?", Physics Today, 2006, pp. 82-83, vol. 59, Issue 6, American Institute of Physics.
Afoakwa, Emmanuel Ohene et al., "Factors influencing rheological and textural qualities in chocolate—a review", Trends in Food Science & Technology, 2007, pp. 290-298, vol. 18, Issue 6.
Lanaro, Matthew et al., "3D printing complex chocolate objects: Platform design, optimization and evaluation", Journal of Food Engineering, 2017, pp. 13-22, vol. 215.
Malone, Evan et al., "Fab@Home: The Personal Desktop Fabricator Kit", Rapid Prototyping Journal, 2007, pp. 245-255, vol. 13, Issue 4.
Mantihal, Sylvester et al., "Optimization of chocolate 3D printing by correlating thermal and flow properties with 3D structure modeling", Innovative Food Science and Emerging Technologies, 2017, pp. 21-29, vol. 44.
Sereno, L. et al., "A new application for food customization with additive manufacturing technologies", AIP Conference Proceedings, Apr. 2012, pp. 825-833, The 4th Manufacturing Engineering Society International Conference (MESIC 2011), vol. 1431, Issue 1.
Aguado, Brian A. et al., "Improving Viability of Stem Cells During Syringe Needle Flow Through the Design of Hydrogel Cell Carriers", Tissue Engineering: Part A, 2012, pp. 806-815, vol. 18, Issue 7-8.
Truby, Ryan L. et al., "Printing soft matter in three dimensions", Nature, Dec. 2016, pp. 371-378, vol. 540.
Chaudhuri, Anirban et al., "Rheological Parameter Estimation for a Ferrous Nanoparticle-based Magnetorheological Fluid using Genetic Algorithms", Journal of Intelligent Material Systems and Structures, Mar. 2006, pp. 261-269, vol. 17, Issue 3.
Costakis Jr, William J., "Additive manufacturing of boron carbide via continuous filament direct ink writing of aqueous ceramic suspensions", Journal of the European Ceramic Society, 2016, pp. 3249-3256, vol. 36.
Shih, Wan Y. et al., "Elastic and Yield Behavior of Strongly Flocculated Colloids", Journal of the American Ceramic Society, 1999, pp. 616-624, vol. 82.
De Graef, Veerle et al., "Chocolate yield stress as measured by oscillatory rheology", Food Research International, 2011, pp. 2660-2665, vol. 44.
Hyun, Kyu et al., "Large amplitude oscillatory shear as a way to classify the complex fluids", Journal of Non-Newtonian Fluid Mechanics, Dec. 2002, pp. 51-65, vol. 107, Issues 1-3.
Miller, R. R. et al., "Rheology of solid propellant dispersions", Journal of Rheology, 1991, pp. 901-920, vol. 35, Issue 5.
Ma, Linglei et al., "Keratin Filament Suspensions Show Unique Micromechanical Properties", Journal of Biological Chemistry, Aug. 1999, pp. 19145-19151, vol. 274, Issue 27.
Liu, Zhenbin et al., "Impact of rheological properties of mashed potatoes on 3D printing", Journal of Food Engineering, 2018, pp. 76-82, vol. 220.
Hamilton, Charles Alan et al., 3D printing Vegemite and Marmite: Redefining "breadboards", Journal of Food Engineering, 2018, pp. 83-88, vol. 220.
Lille, Martina et al., "Applicability of protein and fiber-rich food materials in extrusion-based 3D printing", Journal of Food Engineering, 2018, pp. 20-27, vol. 220.
Bruneaux, Julien et al., "Micro-extrusion of organic inks for direct-write assembly", Journal of Micromechanics and Microengineering, Oct. 2008, 12 pages, vol. 18, Issue 11.
Martanto, Wijaya et al., "Fluid Dynamics in Conically Tapered Microneedles", AIChE Journal, Jun. 2005, pp. 1599-1607, vol. 51, Issue 6.
Schneider, Caroline A. et al., "NIH Image to ImageJ: 25 years of image analysis", Nature Methods, 2012, pp. 671-675, vol. 9.
Habibi, M. et al., "Buckling of Liquid Columns", Physical Review Letters, Feb. 2010, pp. 074301-1-074301-4, vol. 104.
Yuk, Hyunwoo et al., "A New 3D Printing Strategy by Harnessing Deformation, Instability, and Fracture of Viscoelastic Inks", Advanced Materials, Feb. 2018, 31 pages, vol. 30, Issue 6.
Passieux, Renaud et al., "Instability-Assisted Direct Writing of Microstructured Fibers Featuring Sacrificial Bonds", Advanced Materials, May 2015, pp. 3676-3680, vol. 27, Issue 24, WILEY-VCH Verlag GmbH & Co. KGaA.
Barnes, Howard A., "Thixotropy—a review", Journal of Non-Newtonian Fluid Mechanics, May 1997, pp. 1-33 vol. 70, Issues 1-2.

* cited by examiner

Step 1  Step 2  Step 3

CHOCOLATE-BASED INK THREE-DIMENSIONAL PRINTING

CROSS-REFERENCE TO RELATED APPLICATION

This application claims the benefit of priority of Singapore Patent Application No. 10201908631Q, filed 17 Sep. 2019, the content of it being hereby incorporated by reference in its entirety for all purposes.

TECHNICAL FIELD

The present disclosure relates to an edible and three-dimensional (3D) printable ink composition. The present disclosure also relates to a method and a system for 3D printing the edible and 3D printable ink composition.

BACKGROUND

Recent advances in digital fabrication, in particular three-dimensional (3D) printing, may have enabled free-form fabrication of 3D structures and devices from plastics, metals, and other raw materials. To date, 3D printed structures have been widely applied in, for example, sensing, tissue engineering, and physiological vascular modelling. More recently, research on 3D printing tends to focus on direct printing of edible materials. For example, 3D food printing allows printing of foods with customized contents of nutrients, where the nutrients may be, in principle, optimized based on biometric and genomic information. Similar to other existing 3D printing techniques, 3D food printing relies on layer-by-layer fabrication based on the computer-aided design (CAD) data that sets out the manner of sequential depositions of multiple 2D layers to form the 3D printed structure. The food inks may be customized by based on a combination of food ingredients such as carbohydrates, proteins and fat.

Different 3D printing techniques, e.g. selective laser sintering (SLS), ink-jet printing, hot-melt extrusion and binder jetting, have been demonstrated for 3D food printing. Amongst all, extrusion may be the most popular method in 3D food printing. During extrusion, materials (which may be liquid, semi-solid or solid) get forced through a nozzle to fabricate 3D objects. There are several extrusion techniques, such as hot-melt extrusion and gel-forming extrusion. Hot-melt extrusion may be based on the mechanism similar to fused deposition modeling (FDM), which involves (1) heating to flow the ink out of the nozzle and (2) cooling to solidify, e.g. molten chocolates, in the bed. Gel-forming extrusion involves phase change after extrusion of liquid materials. Techniques based on these extrusions have limitations with respect to the stability and self-supporting properties of the printed objects. Nevertheless, owing to their simplicity, these extrusions may be used to print different types of foods. In this connection, chocolates may be commonly used for the demonstration of 3D food printing because it may be patterned by hot-melt extrusion and becomes solid at room temperature. Several studies related to hot-melt extrusion of chocolate have been reported. In reported experiments, the chocolate was melted and dispensed at the temperature of 31 to 36° C. Specifically, attention to temperature was required because the rheological characteristics of the molten chocolate was sensitive to temperature. Hot-melt extrusion of chocolate offers simplicity and accessibility, but there is a drawback which is the control over a required narrow range of operating temperature.

There is thus a need to provide for a solution that addresses one or more of the limitations mentioned above. The solution should at least provide for an edible and 3D printable ink composition, a method and a system of printing the edible and 3D printable ink composition.

SUMMARY

In a first aspect, there is provided for an edible and 3D printable ink composition including:

a chocolate-based material including a chocolate syrup, a chocolate paste, or a combination thereof; and cocoa powder present in an amount ranging from 5 to 25 w/w %, wherein the edible and 3D printable ink composition is both printable and remains in a single phase at a temperature ranging from 20° C. to 30° C.

In another aspect, there is provided for a method of 3D printing an edible and 3D printable ink composition, wherein the edible and 3D printable ink composition includes a chocolate-based material including a chocolate syrup, a chocolate paste, or a combination thereof; and cocoa powder present in an amount ranging from 5 to 25 w/w %, wherein the edible and 3D printable ink composition is both printable and remains in a single phase at a temperature ranging from 20° C. to 30° C., the method including:

providing the edible and 3D printable ink composition; and dispensing the edible and 3D printable ink composition onto a substrate in the absence of temperature control of the edible and 3D printable ink composition.

In another aspect, there is provided for a system operable for printing an edible and 3D printable ink composition, wherein the edible and 3D printable ink composition includes a chocolate-based material including a chocolate syrup, a chocolate paste, or a combination thereof; and cocoa powder present in an amount ranging from 5 to 25 w/w %, wherein the edible and 3D printable ink composition is both printable and remains in a single phase at a temperature ranging from 20° C. to 30° C., the system including:

a dispenser connected to one or more syringes, wherein each of the one or more syringes are configured with a nozzle, wherein the dispenser is operable to dispense the edible and 3D printable ink composition from the nozzle onto a substrate in the absence of temperature control; and a motion control module operable to control movement and position of (i) the one or more syringes with respect to the substrate, and/or (ii) the substrate with respect to the one or more syringes.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which:

FIG. 1B is a schematic illustration of DIW of chocolate-based inks at room temperature. Shear-thinning flow of the ink facilitated easy extrusion through the syringe (Region 1—marked by (1)) and the nozzle (Region 2—marked by (2)). The ink exhibited fluid with yield stress behavior to form self-supporting layers after extrusion (Region 3—marked by (3)).

FIG. 2A is a plot showing viscosity (μ) as a function of applied shear rate (μ̇) for the chocolate syrup with cocoa powders (S0 to S25).

FIG. 2B is a plot showing the chocolate paste with cocoa powders (P0 to P12).

FIG. 3A is a plot of viscosity (μ) as a function of applied shear stress (σ).

FIG. 3B is a plot of yield stress ($\sigma_y$) measured from FIG. 3A as a function of concentration of cocoa in the inks.

FIG. 3C is a plot of parameters of Herschel-Bulkley model (K—open symbols and n—solid symbols) as a function of concentration of cocoa in the inks.

FIG. 3d is a plot of Storage (G', solid lines) and loss moduli (G", dashed lines) as a function of applied oscillatory shear stress (σ) for chocolate syrups (S0 to S25) and cake icing.

FIG. 6A is a plot of storage (G', solid lines) and loss moduli (G", dashed lines) as a function of applied oscillatory shear stress (σ) for the paste-based inks.

FIG. 6B is a plot of elastic modulus (G') in LVR as a function of the concentration of cocoa powder in syrup (S0 to S25), paste (P0 to P12) and cake icing.

FIG. 6C is a comparison of two yield points ($\sigma_1$: stress when G' deviates from LVR and $\sigma_2$: crossover stress at G'=G") as a function of concentration of cocoa powder in syrup (S0 to S25), paste (P0 to P12) and unmodified cake icing.

FIG. 6D is a plot of storage moduli (G', solid lines) and loss moduli (G", dashed lines) as a function of % strain (γ) for S25, P12 and cake icing.

FIG. 10A is an optical image of a general-purpose nozzle and a tapered nozzle.

FIG. 11A shows 3D printed meshes of syrup-based inks (S0 to S25) at two timepoints: 0 min (immediately after printing) and 30 min after printing.

FIG. 11B shows paste-based inks (P0 to P12) at two timepoints: 0 min (immediately after printing) and 30 min after printing.

FIG. 13A shows the formation of gaps due to time lag associated with the dispensing of highly viscous, shear-thinning cake icing. The arrows indicate the locations of the gaps, corresponding to the points where the dispensing of the ink started. Scale bar denotes 1 cm.

FIG. 14A shows a 3D structures of chocolate-based materials, printed with S20 and/or S25. Scale bar denotes 1 cm.

FIG. 14B shows a 3D structures of chocolate-based materials, printed with S20 and/or S25. Scale bar denotes 1 cm.

FIG. 14C shows a 3D structures of chocolate-based materials, printed with S20 and/or S25. Scale bar denotes 1 cm.

FIG. 14D shows a 3D structures of chocolate-based materials, printed with S20 and/or S25. Scale bar denotes 1 cm.

FIG. 14E shows a 3D structures of chocolate-based materials, printed with S20 and/or S25. Scale bar denotes 1 cm.

FIG. 14F shows a 3D structures of chocolate-based materials, printed with S20 and/or S25. Scale bar denotes 1 cm.

FIG. 16A is a schematic illustration of the steps involved in DIW of multi-food materials at room temperature. The sequence of steps allowed to print chocolate with an internal filling. Scale bar denotes 1 cm.

FIG. 16B shows the 3D structure of a cone-shaped enclosure containing a liquid chocolate syrup as a filling bas. Scale bar denotes 1 cm.

FIG. 16C shows an optical image highlighting the liquid chocolate syrup flowing out of the 3D printed enclosure. Scale bar denotes 1 cm.

DETAILED DESCRIPTION

Figure 1A:
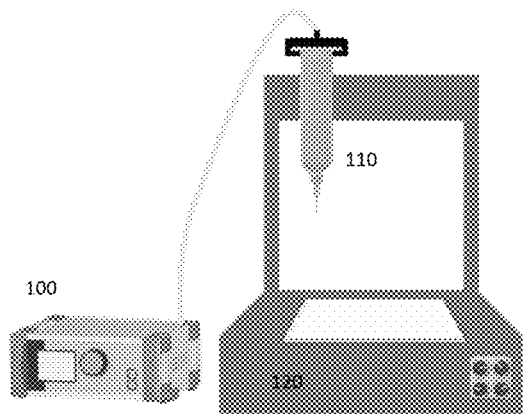
FIG. 1A depicts a schematic of the direct ink writing (DIW) 3D printer and the pneumatic dispenser 100 used to demonstrate the method of the present disclosure.

The following detailed description refers to the accompanying drawings that show, by way of illustration, specific details and embodiments in which the present disclosure may be practiced.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to an edible and 3D printable ink composition. The edible and 3D printable ink composition may be referred herein simply as the ink or ink composition. The edible and 3D printable ink composition may be a chocolate-based ink composition.

The present disclosure also relates to a method of printing such edible and 3D printable ink composition (e.g. chocolate-based inks) at room temperature by cold extrusion compared to conventional methods of chocolate printing based on hot-melt extrusion. Hot-melt extrusion of chocolate unfortunately requires control of temperatures over the narrow operating temperature range. On the other hand, the present method is based on cold extrusion. Advantageously, the present method can be carried out at room temperature (e.g. 20 to 30° C.) without phase change of the ink composition, as the present method may depend on the rheology of printable ink composition instead of operating temperature and control of the operating temperature. Said differently, the manipulation of temperature is not required for the present method, and the entire set of steps for the present printing method can be performed at room temperature.

In the present method, the editable and 3D printable ink composition may be prepared from "chocolate-based inks" by mixing readily available chocolate products (e.g. syrups and/or pastes) with cocoa powder to alter the rheology of the ink. The formulated inks advantageously exhibited shear-thinning behavior for easy extrusion through syringes and nozzles, and formed self-supporting layers after extrusion to maintain the printed structures. Under the conditions demonstrated for printing, it is shown herein the creation of 3D models which may be carried out using either a single or multiple chocolate-based inks. Moreover, multi-material food printing is rendered possible, using multiple nozzles, by the present method and ink composition. A multi-material food object may include a range of liquid materials as fillings such as milk-based products (e.g. cream and yogurt) is possible. The present method offers an advantageous route of 3D modeling of food, especially when food ingredients or additives are sensitive to temperature.

Details of the various aspects and embodiments of the present edible and 3D printable ink composition, present method, present system, and advantages associated with the various aspects and embodiments are now described below. The advantages are also described and/or demonstrated in the examples of the present disclosure.

In a first aspect of the present disclosure, there is provided an edible and 3D printable ink composition including a chocolate-based material that includes a chocolate syrup, a chocolate paste, or a combination thereof, and cocoa powder present in an amount ranging from 5 to 25 w/w %, wherein the edible and 3D printable ink composition is both printable and remains in a single phase at a temperature ranging from 20° C. to 30° C. The term "chocolate syrup" herein refers to chocolate that contains an amount of water sufficient for the chocolate to maintain a liquid form, wherein such chocolate remains fluid and can spread across a surface on its own without artificial intervention. The term "chocolate paste" herein refers to chocolate that is not able to spread independently and requires artificial intervention to be spread across a surface. A chocolate paste contains substantially less amount of water, or completely no water, compared to a chocolate syrup. An example of a chocolate syrup and chocolate paste is described in Table 1 in the examples section of the present disclosure.

In various aspects, the cocoa powder may be present in an amount ranging from 10 to 25 w/w %, 12 to 25 w/w %, 15 to 25 w/w %, 20 to 25 w/w %, etc. Such amounts help to render the edible and 3D printable ink composition possible for extrusion through a syringe or nozzle without compromising print fidelity of the resultant 3D structure. The term "fidelity" herein refers to the accuracy of the printed 3D structure based on the inputs provided to a software that modulates/operates how the ink composition is dispensed to afford a completely or substantially identical printed 3D structure.

In various aspects, the chocolate-based material may be a chocolate syrup and the cocoa powder may be present in an amount ranging from 20 to 25 w/w %. In various aspects, the chocolate-based material may be a chocolate paste and the cocoa powder may be present in an amount ranging from 10 to 12 w/w %. Such amounts of cocoa powder help to maintain print fidelity of the printed 3D structure. For example, if the chocolate syrup or chocolate paste contains too little cocoa powder, the chocolate syrup or paste may not be printed properly, such that the ink composition extruded/dispensed from the syringe undesirably spreads out thereafter.

In various aspects, the edible and 3D printable ink composition may be a thixotropic fluid. The term "thixotropic fluid" herein refers to a fluid which can take a certain amount of time to attain equilibrium viscosity when introduced to a steep change in shear rate. In other words, thixotropic fluids may remain thick or viscous under static conditions but flows (e.g. become thinner, less viscous) over time when shaken, agitated, stressed (e.g. shear-stressed).

In various aspects, the edible and 3D printable ink composition may have a flow consistency index ranging from more than 0 Pa s″ to 25 Pa s″, 5 Pa s″ to 25 Pa s″, 10 Pa s″ to 25 Pa s″, 15 Pa s″ to 25 Pa s″, 20 Pa s″ to 25 Pa s″, wherein n denotes a shear-thinning index ranging from more than 0 to less than 1. The edible and 3D printable ink composition may have a yield stress ranging from 2 Pa to 300 Pa, 10 Pa to 300 Pa, 50 Pa to 300 Pa, 100 Pa to 300 Pa, 150 Pa to 300 Pa, 200 Pa to 300 Pa, 250 Pa to 300 Pa, etc. The edible and 3D printable ink composition may have a storage modulus ranging from 10 Pa to 1 MPa, 100 Pa to 1 MPa, 1000 Pa to 1 MPa, 10000 Pa to 1 MPa, 100000 Pa to 1 MPa, etc. Advantages of these parameters are demonstrated in the examples section of the present disclosure and shall not be iterated for brevity.

The edible and 3D printable ink composition may further include cake icing, a milk-based product, or a combination thereof, wherein the milk-based product may include cream, yogurt, or a combination thereof. Advantageously, the present method allows for printing of various food ingredients, and not just chocolate-based materials, to produce 3D structures.

In another aspect of the present disclosure, there is provided a method of 3D printing an edible and 3D printable ink composition, wherein the edible and 3D printable ink composition includes a chocolate-based material that includes a chocolate syrup, a chocolate paste, or a combination thereof, and cocoa powder present in an amount ranging from 5 to 25 w/w %, wherein the edible and 3D printable ink composition is both printable and remains in a single phase at a temperature ranging from 20° C. to 30° C. The method may include providing the edible and 3D printable ink composition, and dispensing the edible and 3D printable ink composition onto a substrate in the absence of temperature control of the edible and 3D printable ink composition. Embodiments and advantages described for the present edible and 3D printable ink composition of the first aspect can be analogously valid for the present method subsequently described herein, and vice versa. As the various embodiments and advantages have already been described above and in examples demonstrated herein, they shall not be iterated for brevity.

In various aspects, providing the edible and 3D printable ink composition may include filling one or more syringes with the edible and 3D printable ink composition, wherein each of the one or more syringes may be configured with a nozzle.

In various aspects, dispensing the edible and 3D printable ink composition may include positioning the nozzle at a distance from the edible and 3D printable ink composition which may have deposited on the substrate, wherein the distance ranges from 400 μm to 700 μm, 450 μm to 700 μm, 500 μm to 700 μm, 550 μm to 700 μm, 600 μm to 700 μm, 650 μm to 700 μm, etc. Advantages of this parameter are demonstrated in the examples section of the present disclosure and shall not be iterated for brevity.

The present method may further include maintaining the nozzle at a position with respect to the substrate where dispensing starts so as to compensate for a delay in flow of the edible and 3D printable ink composition from the nozzle to the substrate. Said differently, the nozzle may start at position A and end at position B, printing a straight line from A to B. The nozzle may then move in a direction different from the direction of movement from positions A to B. For example, the nozzle may move perpendicular to the ink composition printed that forms a straight line between positions A and B. Before moving from position B to next position C, there may be a time lag in the movement of the syringe, and hence a time lag in the motion of nozzle, to avoid formation of any gaps in printed ink composition at position B when moving to position C. Hence, the present ink composition and method are advantageous in that forming the printed 3D structure does not suffer from extensive time lag, but also maintains a reasonable degree of print fidelity.

In various aspects, dispensing the edible and 3D printable ink composition may include dispensing the edible and 3D printable ink composition at a temperature ranging from 20° C. to 30° C., 20° C. to 25° C., 25° C. to 30° C., etc.

In various aspects, dispensing the edible and 3D printable ink composition may include applying a pressure ranging from 100 to 550 kPa, 150 to 550 kPa, 200 to 550 kPa, 250 to 550 kPa, 300 to 550 kPa, 350 to 550 kPa, 400 to 550 kPa, 450 to 550 kPa, 500 to 550 kPa, etc., to dispense the edible and 3D printable ink composition. Advantages of this parameter are demonstrated in the examples section of the present disclosure and shall not be iterated for brevity.

In another aspect of the present disclosure, there is provided a system operable for printing an edible and 3D printable ink composition, wherein the edible and 3D printable ink composition may include a chocolate-based material that includes a chocolate syrup, a chocolate paste, or a combination thereof, and cocoa powder present in an amount ranging from 5 to 25 w/w %, wherein the edible and 3D printable ink composition is both printable and remains in a single phase at a temperature ranging from 20° C. to 30° C. The system may include a dispenser connected to one or more syringes, wherein each of the one or more syringes may be configured with a nozzle, wherein the dispenser may be operable to dispense the edible and 3D printable ink composition from the nozzle onto a substrate in the absence of temperature control, and a motion control module operable to control movement and position of (i) the one or more syringes with respect to the substrate, and/or (ii) the substrate with respect to the one or more syringes. Embodiments and advantages described for the present edible and 3D printable ink composition of the first aspect and the present method of the subsequent aspect can be analogously valid for the present system subsequently described herein, and vice versa. As the various embodiments and advantages have already been described above and in examples demonstrated herein, they shall not be iterated for brevity.

In various aspects, the motion control module may be operable to move the nozzle vertically toward and vertically away from the substrate, and horizontally across the substrate.

In various aspects, the motion control module may be operable to position the nozzle at a distance from the edible and 3D printable ink composition which has deposited on the substrate, wherein the distance ranges from 400 μm to 700 μm.

In various aspects, the motion control module may be further operable to position the nozzle at a location with respect to the substrate where dispensing starts so as to compensate for a delay in flow of the edible and 3D printable ink composition from the nozzle to the substrate.

In various aspects, the dispenser may be operable to apply a pressure ranging from 100 to 550 kPa to dispense the edible and 3D printable ink composition.

In summary, recent advances in 3D printing technology has enabled to shape food into unique and complex 3D shapes. To showcase the capability of 3D food printing, chocolates may be used as printing inks, and 3D printing based on hot-melt extrusion have been demonstrated to model 3D chocolate products. However, hot-melt extrusion of chocolates, as one example, adversely requires precise control over the operating temperature and in a narrow range. The present ink composition, method and system, circumvent this. Chocolate-based inks were directly printed in its liquid phase using direct ink writing (DIW) 3D printer to model complex 3D shapes without temperature control based on the present ink composition, method and system. The present method may be termed herein as chocolate-based ink 3D printing (Ci3DP). The printing inks can be prepared by mixing readily available chocolate syrup and paste with cocoa powders at 5 to 25 w/w % to achieve desired rheological properties. High concentrations of cocoa powders in the chocolate-based inks exhibited shear-thinning properties with viscosities ranging from $10^2$ to $10^4$ Pa·s, wherein the inks also possessed finite yield stresses at rest. Rheology of the present inks can be easily analyzed by quantifying the degree of shear-thinning by fitting the experimental data of shear stress as a function of shear rate to Herschel-Bulkley model. It is demonstrated in the present disclosure the fabrication of 3D models consisting of chocolate syrups and pastes mixed with the concentration of cocoa powders at 10 to 25 w/w %. The same method was extended to fabricate chocolate-based models consisting of multiple type of chocolate-based inks (e.g. semi-solid enclosure and liquid filling). The simplicity and flexibility of the present Ci3DP method offer great potentials in fabricating complex chocolate-based products without temperature control. Accordingly, the present method of 3D printing of chocolate-based inks is advantageous over hot-melt extrusion technologies. The present disclosure, as already described above and herein, includes development of chocolate-based inks that allows to fabricate 3D structures, and to print different food materials. The present method is an easy technique for direct printing of edible materials and improves aesthetic quality of printed food (e.g. personalize the food). Such food may be useful for specific needs in hospitals and elderly care home. The present ink composition, method and system may be compatible/complementary with various 3D printers that work based on cold extrusion. The present method may overcome any of the limitations described above for printing of food materials, e.g. chocolate-based inks.

The word "substantially" does not exclude "completely" e.g. a composition which is "substantially free" from Y may be completely free from Y. Where necessary, the word "substantially" may be omitted from the definition of the subject matters of the present disclosure.

In the context of various aspects and/or embodiments, the articles "a", "an" and "the" as used with regard to a feature or element include a reference to one or more of the features or elements.

In the context of various aspects and/or embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to an edible and 3D printable ink composition, a method of 3D printing of the edible and 3D printable ink composition in its liquid phase at room temperature, and a system operable for printing the edible and 3D printable ink composition. The edible and 3D printable ink composition may be a chocolate-based material. The chocolate-based material may be termed herein a "chocolate-based ink" as it is printable. The present method may be termed herein "chocolate-based ink 3D printing (Ci3DP)".

The edible and 3D printable ink composition may be a chocolate-based ink that includees chocolate syrup and/or chocolate paste mixed with varying concentrations of cocoa powders. Mixing with the cocoa powders modifies the rheological properties of the chocolate-based ink. The rheology-modified chocolate-based ink may exhibit viscous and Herschel-Bulkley fluid properties, and may be printable using a direct ink writing (DIW) 3D printer without the need to control the temperature used for printing. Ci3DP may be complementary to existing hot-melt extrusion methods of 3D printing chocolates wherein the ink, such as a chocolate-based material, is heated to become molten before patterning.

The present edible and 3D printable ink composition, method and system, may be compatibly used with a wide selection of chocolate-based materials, allows for the ink composition's properties to be altered, so as to render the present ink composition 3D printable at room temperature to form printed chocolate-based products.

The present edible and 3D printable ink composition, method and system, are described in further details, by way of non-limiting examples, as set forth below.

Example 1: Discussion of Chocolate and Chocolate-Based Materials

Chocolate may be a complex emulsion of fine solid particles of sugar and cocoa in a continuous fat phase, is a universally loved food. Chocolates may be solid at room temperature (e.g. 20 to 25° C., 20 to 30° C.) and may melt in human mouth and saliva (37° C.). The melting characteristics and texture of chocolates may depend on the types and proportions of cocoa and other ingredients, and the methods involved for blending and processing such ingredients. The components for forming a chocolate may be mixed, refined and conched during processing so that a suitable viscosity of the chocolate is obtained prior to tempering. Chocolates may be used for the demonstration of 3D food printing because it may be patterned by hot-melt extrusion and then revert to a solid at room temperature. Several studies related to hot-melt extrusion of chocolate are available in the literature. In reported experiments, the chocolate was melted and dispensed at 31 to 36° C., wherein attention to the temperature was required as the rheological characteristics of the molten chocolate was sensitive to temperature. Hot-melt extrusion of chocolate offers simplicity and accessibility, but there is a drawback in its printing mechanism, which is the control required for a narrow range of operating temperature.

In one reported example, a simple, low-cost, user modifiable freeform fabrication system was developed. The system may build objects including multiple materials including chocolate, with sub-millimetre-scale features. In another reported example, a syringe compatible with the fabrication system was developed for manufacturing 3D objects of two different edible materials, chocolate and jam, wherein the syringe is a metallic deposition syringe that required heating to process chocolate while controlling the required temperature. The heating system consisted of a loop of hot air covered with a tube built around the syringe to control the required temperature for printing of chocolate. In another reported example, a method for printing of creative and personalised 3D chocolate products was developed, which includes chocolate extruded at 32 to 40° C. Optimization of process parameters such as extrusion rate, velocity of nozzle and height of the nozzle was performed to fabricate 3D structures of chocolate. In another reported example, details of the construction of a melt extrusion 3D printer based on readily available open source components were presented. Several key parameters of fabrication were investigated and optimised to enable 3D printing of complex objects of chocolate. In another reported example, 3D shape of chocolate with different support structures (cross support, parallel support and no support) were designed. The effect of these support structures on the snapping properties was investigated. The nozzle temperature was maintained at 32° C. in order to extrude the melted state of the chocolate. Increased efficiency in flow of the melted chocolate by adding magnesium stearate (MgST) in the chocolate was observed.

On the other hand, cold extrusion of chocolate depends on the rheology of printing ink at the operating temperature. The manipulation of temperature is not required, and the entire printing can be performed at room temperature. 3D modelling of chocolate-based materials by cold extrusion may not have been well-studied to date, which may be due to a lack of inks possessing suitable rheological properties. The present method provides for printing chocolate-based inks at room temperature by cold extrusion. In the present method, "chocolate-based inks" are used. "Chocolate-based inks" are referred herein as liquid chocolate products mixed with cocoa powders, i.e. readily available chocolate products (e.g. syrups and/or pastes) were mixed with cocoa powder to alter the rheology of the ink. The rheological properties of the chocolate-based inks were studied to identify the properties suitable for DIW at room temperature. To obtain good print fidelity, the effects of three parameters of the printing, which are applied pressure (P), deposited mass of the ink per unit length (m), and the distance between two layers ($\Delta z$), were studied. Under the conditions tested for printing, it is demonstrated in the present disclosure creation of 3D models using a single and/or multiple chocolate-based inks. The present Ci3DP method is capable of fabricating 3D structures at room temperature, and the principles and methods presented herein can be applied for use in a toolkit designed for 3D food printing and to 3D print other edible inks by a DIW printer. The term "toolkit" is herein interchangeably referred to as the present system.

Example 2: Preparation of Inks

Three food syrups and pastes were tested for their suitability with the present 3D printing method. A cake icing was used as purchased. The chocolate-based inks were prepared by mixing different concentrations of cocoa powder (Hershey, USA) in a chocolate syrup (Hershey, USA) and/or a hazelnut chocolate spread (Nutella, Singapore). The major ingredients of the chocolate-based inks are summarized in Table 1 below.

TABLE 1

Major ingredients of the printing ink

| Product | Ingredients |
| --- | --- |
| Chocolate syrup | High fructose corn syrup, corn syrup, water, cocoa, sugar |
| chocolate spread | Sugar, vegetable fat (palm), hazelnuts, fat reduced cocoa powder, skimmed milk powder, whey powder |
| cocoa powder | Sugar, vegetable shortening (palm, sunflower and hydrogenated cottonseed oils), water, corn syrup |

The formulated chocolate inks were stirred continuously to be homogeneous and then stored in sealed bottles until used for printing.

Example 3: Rheological Characterization

The measurements of the rheological properties were conducted using a rheometer (Discovery HR-2, TA Instruments, USA) with a 40 mm parallel plate. The gap between the plate and the stationary flatbed was 1000 μm in all the rheological experiments. A spatula was used to deposit the ink carefully on the bottom plate. The top plate was lowered to a set gap of 1000 μm. The excess sample squeezed out between the plates was then removed neatly to avoid the edge effects. Similar loading procedure was followed for all the measurements. All experiments were performed at room temperature and under ambient pressure. Viscosity test were performed by applying a stepwise shear rate ramp from 0.01 to 2000 s$^{-1}$. A measure of thixotropy of the inks was studied by thixotropy loop test. The applied shear rate was logarithmically increased from 0.0001 to 10 s$^{-1}$ and then returned back to the initial shear rate at the same time interval. The shear stress versus the shear rate was plotted and the inbound area between upper and lower curve was measured as a measure of thixotropy. Storage modulus (G') and loss modulus (G") were determined by oscillatory stress sweep test by applying sinusoidally varying stresses ranging from 0.1 to 3000 Pa with a constant frequency of 1 Hz. Variation of storage and loss moduli with respect to applied shear stress of the printing inks provided information on the sample microstructure. This test allowed determination of linear viscoelastic region (LVR) of the samples. All the data from rheological measurements such as viscosity, yield stress, elastic modulus and thixotropic loop area was reproduced five times and presented as average values with the standard deviation.

Example 4: DIW 3D Printer

The setup of experiment used in this work is shown FIG. 1A. Inks were deposited using a DIW 3D printer using a commercial 3D printing robot 120 and a dispenser 100 (SHOTmini 200 Sx and IMAGE MASTER 350 PC Smart, Musashi Engineering Inc., Japan). The liquid dispenser 100 was equipped with a single syringe that can be charged with inks 110 with different formulations and was attached with a precise pressure controller (ML-5000XII and ML-808GX, Musashi Engineering Inc., Japan).

Example 5: Protocol for Present Ci3DP Method

The workflow used to fabricate the 3D printed objects in the present example was as follows: MuCAD V software (Musashi Engineering Inc., Japan) was used to generate the design and printed using liquid dispensers. For 3D designs, STL models that can be obtained online were used.

The STL models were then scaled down and sliced using the Slic3r software into 200-500 μm thick layers to generate the G-code instructions. Then the G-Code was converted into MuCAD V recognizable format by a customized Python script and then sent to the printer. The inks were directly poured into cylindrical dispensing barrels for printing based on the present Ci3DP. The nozzle was attached to the cylindrical ink barrel and placed into its respective position in the liquid dispenser. For every nozzle attached, calibrations in xy- and z-directions (nozzle-to-substrate distance) were performed. The pressure required for the extrusion, dispensing head velocity in each of three directions, dispensing head acceleration and deceleration times were calibrated according to the printing pattern to be fabricated and the viscosity of the ink. The chocolate-based inks were extruded through the attached nozzle to form a filament that was deposited onto the glass substrate in a series of layers. All the experiments were performed at room temperature.

Example 6: Imaging

Photographs were taken using a Nikon D5600 camera (Nikon, Japan) and Hirox digital microscope KH-8700 (Hirox Co Ltd., Japan) under white-light illumination. All image processing was done using ImageJ software.

Example 7A: Discussion—Overview of Present Method

Figure 1B:
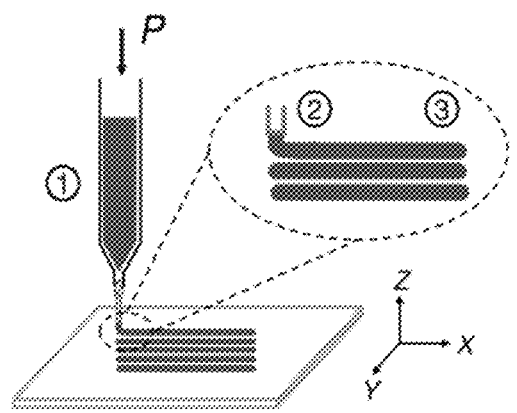
FIG. 1B demonstrates for the present chocolate-based ink 3D printing (Ci3DP) method.
Figure 1C:
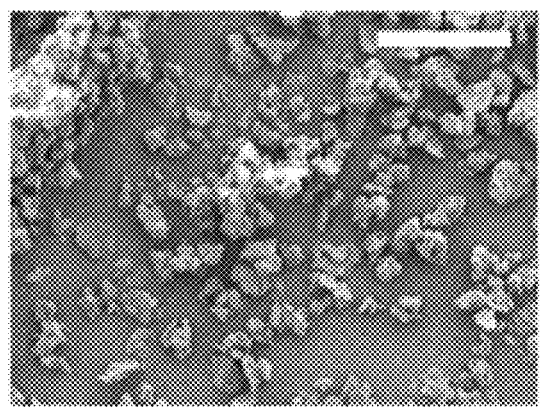
FIG. 1C is a scanning electron microscopy (SEM) image of cocoa powder used to prepare chocolate-based inks in the present Ci3DP. Scale bar denotes 50 μm.
Figure 1D:
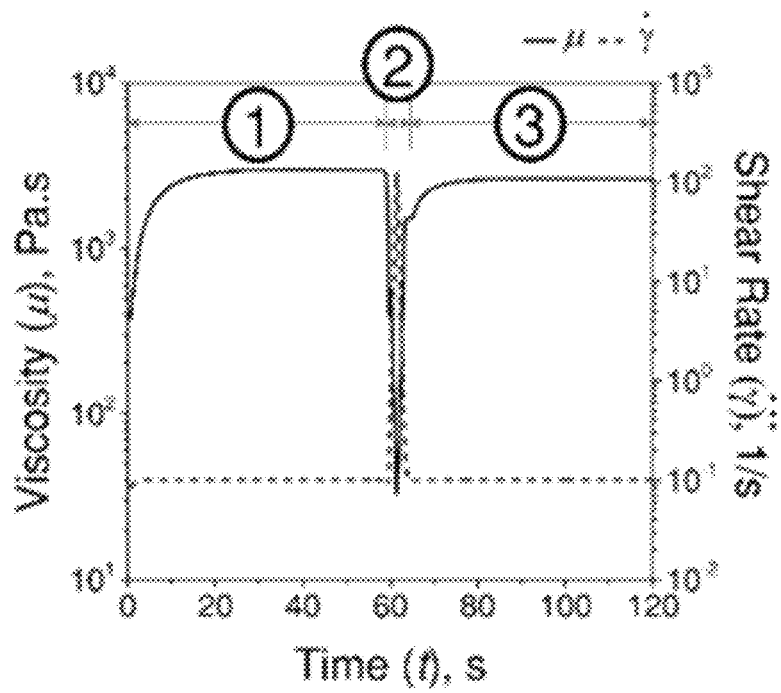
FIG. 1D depicts the representative flow of chocolate-based ink during extrusion through syringe (Region 1—marked by (1)), during extrusion through nozzle (Region 2—marked by (2)), and after extrusion through nozzle (Region 3—marked by (3)) by measuring μ with the change in $\dot{\gamma}$ by rheometry.
Figure 1E:
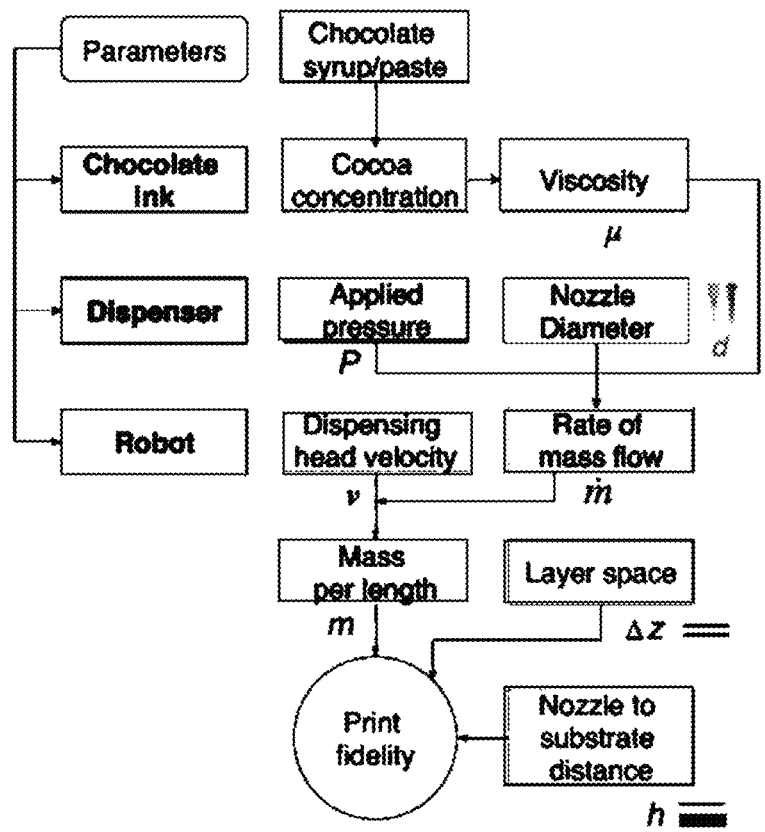
FIG. 1E shows the parameters in the present Ci3DP to be considered for printing.

The general scheme of Ci3DP is shown in FIG. 1B. Chocolate-based inks were formulated by mixing syrup and/or paste with cocoa powder (FIG. 1C). The printability of the chocolate-based inks was evaluated as follows: rheological properties of the chocolate-based inks and parameters of DIW 3D printing. The rheological properties of the formulated inks determined the suitability of the inks to perform cold extrusion. The formulated inks exhibited shear-thinning behavior for easy extrusion through the syringes and nozzles, and form self-supporting layers after extrusion to maintain the printed structures (FIG. 1D and example 7B). It may be confirmed that the dimension of the printed inks were maintained without spreading when the ink contained high concentration of cocoa powders. Commercially available cake icing was used without modification as a reference of a printable material with suitable rheological properties. Thereafter, the parameters of 3D printing were identified (FIG. 1E). A DIW 3D printer herein included a dispenser and a motion control robot (FIG. 1A). The operating parameters were identified for the successful 3D modelling of chocolate-based inks to ensure proper attachment between printed layers, which demonstrated fabrication of 3D models consisting of chocolate-based inks without temperature control.

Example 7B: Discussion—Modeling the Flow of Ink in Present Ci3DP

The flow of ink through the syringe and the nozzle, and the rebuilding time of the internal microstructure of the ink once it exits the nozzle was modelled by observing the change in μ with a change in γ' by rheometry (FIGS. 1B and 1C). The ink experienced low γ (less than 1 s$^{-1}$) in a syringe. In the nozzle, γ increased to the values of $10^2$ to $10^4$ s$^{-1}$, depending on the flow rate. When the ink exited the nozzle, flow of the ink stopped. The ink quickly regained a large value of μ to form self-supporting layers. The change in μ suggested fast recovery of the microstructures of the chocolate inks, supporting the applicability of the inks in present DIW 3D printing.

Example 8A: Discussion—Parameters in Ci3DP

Successful Ci3DP may be more compatible with chocolate-based ink having adequate rheological properties, and the use of the right setting of the instrument. In brief, DIW 3D printing have three different elements requiring consideration: ink, dispenser, and robot (FIG. 1A). Firstly, the printing ink must exhibit suitable rheological characteristics. In an example described further below, the yield stress ($\sigma_y$) and the storage modulus (G') of the ink were the most crucial parameters that governed the outcomes of printing. Secondly, the dispenser (including the pressure source, syringe and nozzle) determined the rate of mass flow dispensed from the nozzle. The nozzle attached to the syringe provided high fluidic resistance to the viscous fluid flowing through it. The applied pressure drop (ΔP) and the diameter of the nozzle (d)

governed the rate of mass flow through the given nozzle ($\dot{m}$). Finally, the motion-control robot (attached to the syringe and the nozzle) controlled the movement of the syringe during the deposition of the ink. The velocity of the dispensing head (i.e. syringe and nozzle) (v) determined the mass of the ink dispensed per unit length ($m=\dot{m}/v$). The robot also offered the control over the motion in the vertical direction (i.e. perpendicular to the layer of printing). When the 3D model is created layer by layer, the distance between adjacent layers ($\Delta z$) and the nozzle-to-substrate distance (h) were considered to achieve good print fidelity (see example 8B below). The relationship between the investigated parameters are summarized in FIG. 1E.

Example 8B: Discussion—Effect of h and $\Delta z$ on Fidelity of Printing

The distance between the vertical positions of the dispensed filaments affected the fidelity of printing of the 3D printed objects. The nozzle-to-substrate distance (h) was to be considered for the stability of the extruded filament of the ink deposited on the substrate. The extruded filament of the ink on a stationary substrate undergoes liquid rope-coil instability when the distance exceeds a critical value. When the nozzle or substrate are not stationary, the printing parameters need to be investigated and adjusted correctly. For the extruded filament coming out of the nozzle, three different conditions are possible based on the velocity of the extruded filament coming out of the nozzle ($v_i$) and the velocity of the dispensing head (v): (1) $v=v_i$, no instability and formation of a straight filament, (2) $v>v_i$, stretching of the extruded filament which may either break or form a thinner straight filament, and (3) $v<v_i$, undergo instability that produces meandering or coiling patterns.

Print tests were initially performed to determine the layer height ($\Delta z$) required to render 3D models. Three situations based on $\Delta P$ were identified, as $v_i$ was increased when $\Delta P$ was increased. Firstly, when $v \ll v_i$ (w>>d, over-extrusion), expanded and flattened filament was obtained which resulted in dragging of the previously extruded ink by the moving nozzle. Secondly, when $v \leq v_i$ (w>d, desired extrusion), slightly wide filament was obtained. Finally, when $v>v_i$ (w<d, under-extrusion), stretching or broken filament were obtained. The second situation was desirable in the present Ci3DP for the proper attachment of the adjacent layers, wherein the extruded filament spreads on the printed layer to ensure the fidelity of the printing.

In a representative condition with the cake icing as printing ink ($\mu=1.54\times10^4$ Pa·s), $\Delta P$ and d were set at 150 kPa and 700 respectively, to obtain m=4.6 mg/cm. Under this condition, the deposited filament had the width of 1126±24 µm and the height of 488±12 µm. The layer height was set as $\Delta z=400$ µm (which was lower than the printed layer height) to ensure the adhesion between two adjacent layers of the printed chocolate-based inks to achieve good fidelity of printing. Similar parameters of the printing conditions may be used for each of the inks.

Example 9: Discussion—Rheological Characterization of Chocolate-Based Inks

Figure 2A:
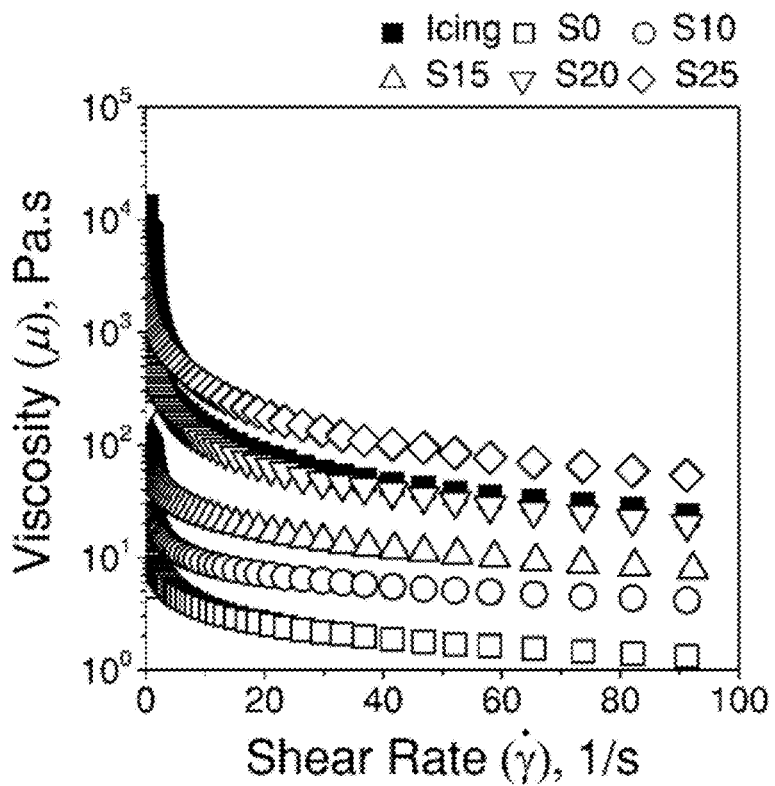
FIG. 2A demonstrates for rheological characterization of chocolate-based inks and cake icing.
Figure 2B:
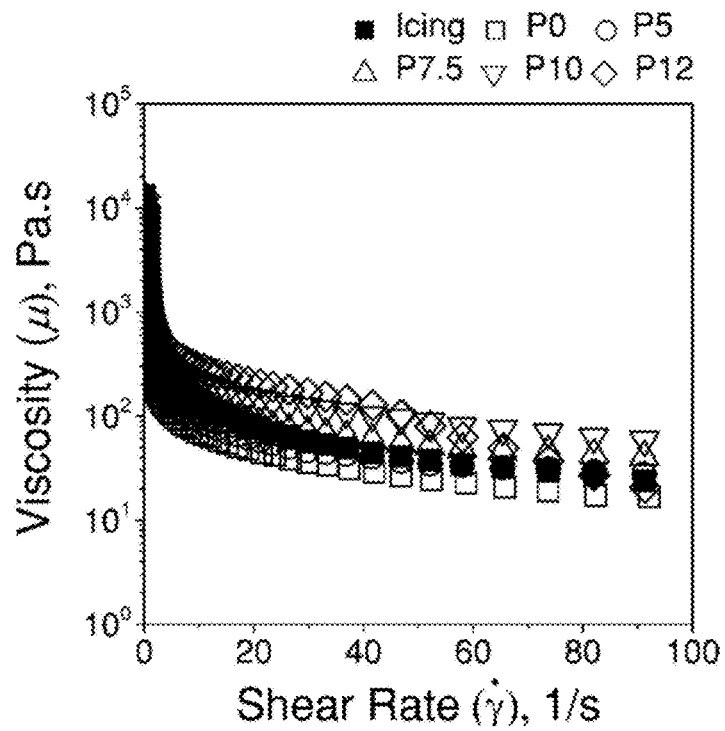
FIG. 2B shows rheological characterization of chocolate-based inks and cake icing.

Initially, chocolate-based inks were characterized for viscosity ($\mu$), yield stress ($\sigma_y$) and recovery behavior. The inks were prepared by adding cocoa powders to chocolate syrup (10 to 25 w/w %, wherein 10 w/w % is denoted as S10 etc.) and to chocolate paste (5 to 12 w/w %, 5 w/w % is denoted as P5 etc.). The measurements of $\mu$ as a function of shear rate ($\dot{\gamma}$) are presented (see FIGS. 2A and 2B). For the range of the concentrations explored, the addition of cocoa powder increased $\mu$ by $10^4$ for chocolate syrups ($10^1$ Pa·s for S0 and $10^4$ Pa·s for S25) and by $10^2$ for chocolate pastes (~800 Pa·s for P0 and $10^4$ Pa·s for P12). Inks with $\mu$>100 Pa·s were printable by a DIW 3D printer. The viscosity of the inks decreased as $\dot{\gamma}$ increased, suggesting the shear-thinning behavior. This property was desirable for DIW because the ink needs to be dispensed through narrow nozzles at the pressure provided by the dispenser.

Figure 3A:
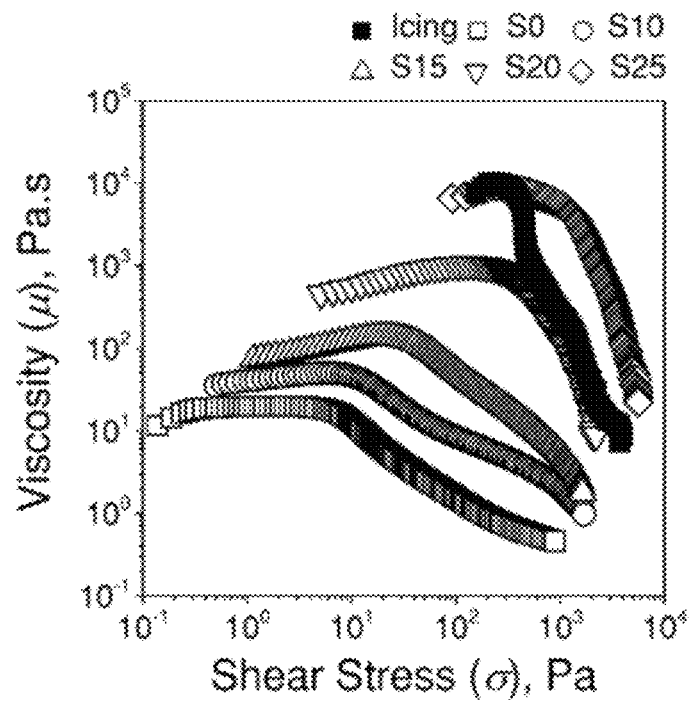
FIG. 3A demonstrates for rheological characterization of syrup (S0), syrup with cocoa powder (S10 to S25), paste (P0), paste with cocoa powder (P5 to P12) and cake icing.
Figure 3B:
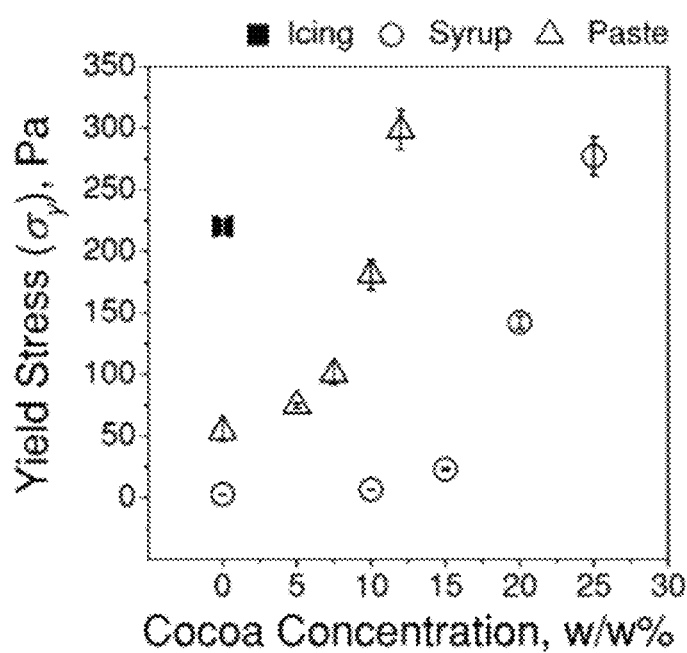
FIG. 3B demonstrates for rheological characterization of syrup (S0), syrup with cocoa powder (S10 to S25), paste (P0), paste with cocoa powder (P5 to P12) and cake icing.
Figure 4A:
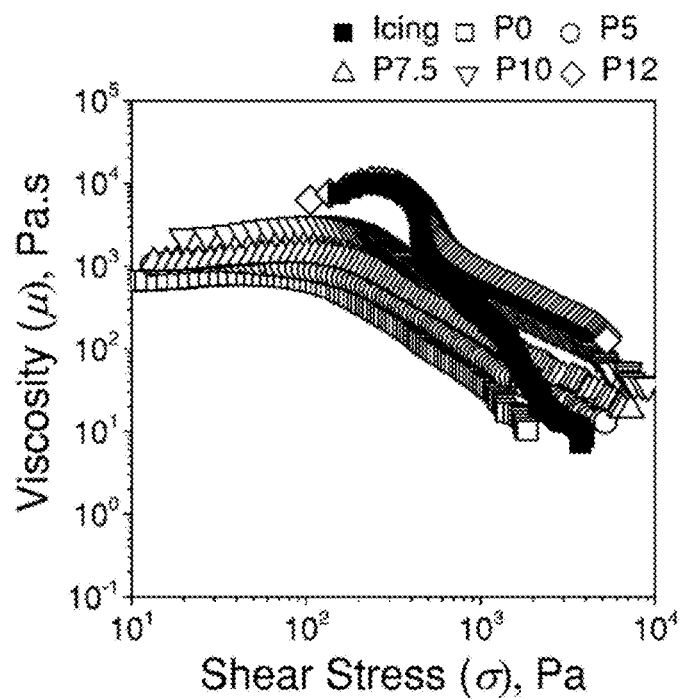
FIG. 4A is a plot of viscosity (μ) as a function of applied shear stress (σ) for the chocolate paste with cocoa powders (P0 to P12) and cake icing.
Figure 4B:
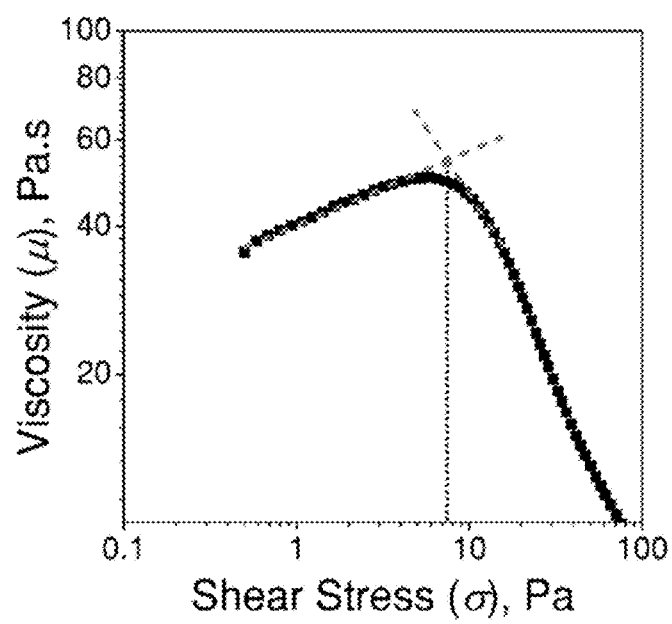
FIG. 4B is a determination of yield stress ($\sigma_y$) from a plot of viscosity (μ) as a function of applied shear stress (σ) using the intersection of two tangent lines.

An important insight into printability is provided by $\sigma_y$ of the inks. To determine $\sigma_y$ of the inks, a shear stress ramp was performed, wherein $\sigma_y$ was analyzed by observing $\mu$ at which the ink started flowing. As shear stress ($\sigma$) was gradually increased, sudden decrease in $\mu$ suggested yielding of the fluid (FIG. 3A for chocolate syrup and FIG. 4A for chocolate paste). $\sigma_y$ was determined using the intersection point of two tangents—one in the plateau-region of $\mu$ where the ink deformed elastically and one in the region where $\mu$ dropped and the ink started to flow (FIG. 4B). The van der Waals interactions between the colloidal particles were broken once a exceeded $\sigma_y$. The values of $\sigma_y$ was measured as a function of the concentration of cocoa (FIG. 3B). The measurement suggested that the addition of the cocoa powder increased $\sigma_y$ from 0 (S0) to 277±22 Pa (S25) for the chocolate syrup, and from 54±8 (P0) to 298±16 Pa (P12) for the chocolate paste. The increase in $\sigma_y$ suggested that the colloidal network within the ink was reinforced by high cocoa concentration. As a reference material, $\sigma_y$ for unmodified cake icing was measured to be 220±8 Pa. The cake icing forms self-supporting layers (as they are used to create 3D decorations on cakes), and the measurement verified that formulated chocolate-based inks possessed the same order of $\sigma_y$ as cake icing. The high values of $\sigma_y$ guaranteed the inks to maintain the printed structures once printed.

Example 10A: Discussion—Shear-Thinning Behaviors of the Ink

Figure 3C:
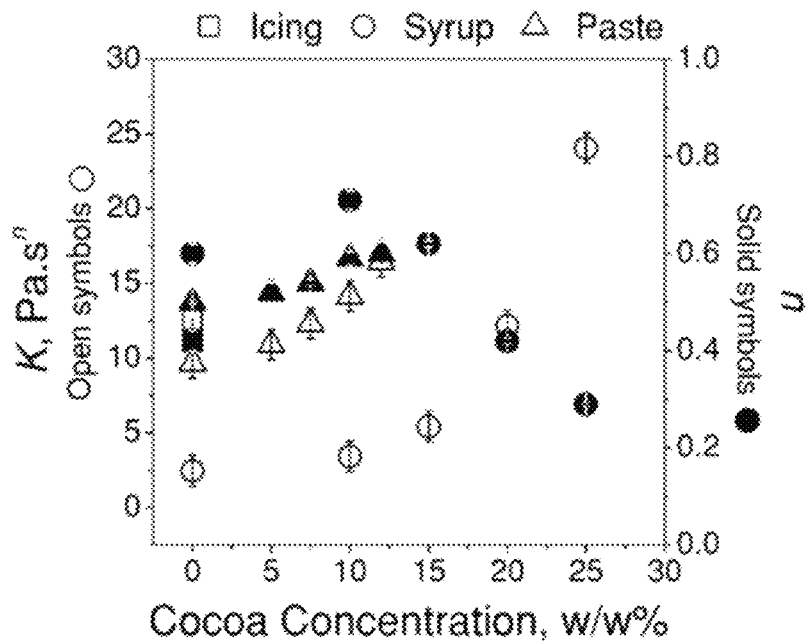
FIG. 3C demonstrates for rheological characterization of syrup (S0), syrup with cocoa powder (S10 to S25), paste (P0), paste with cocoa powder (P5 to P12) and cake icing.
Figure 5A:
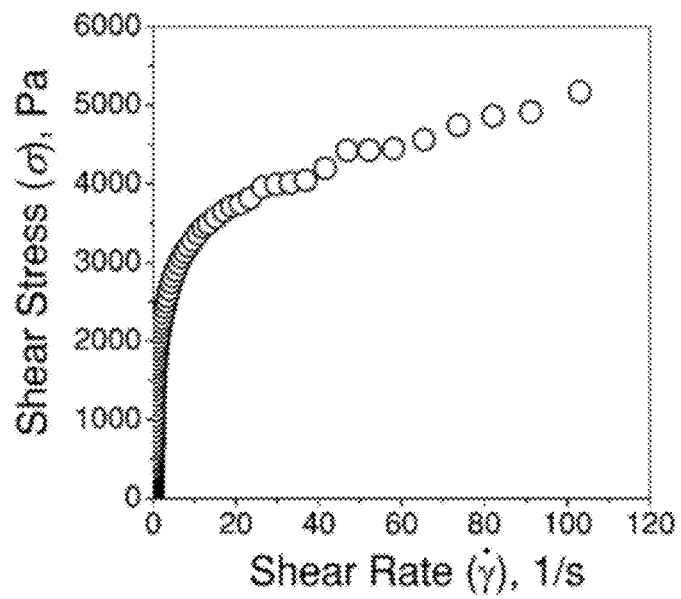
FIG. 5A is a plot of shear stress (σ) as a function of applied shear rate (μ̇) for the syrup-based ink (S25).
Figure 5B:
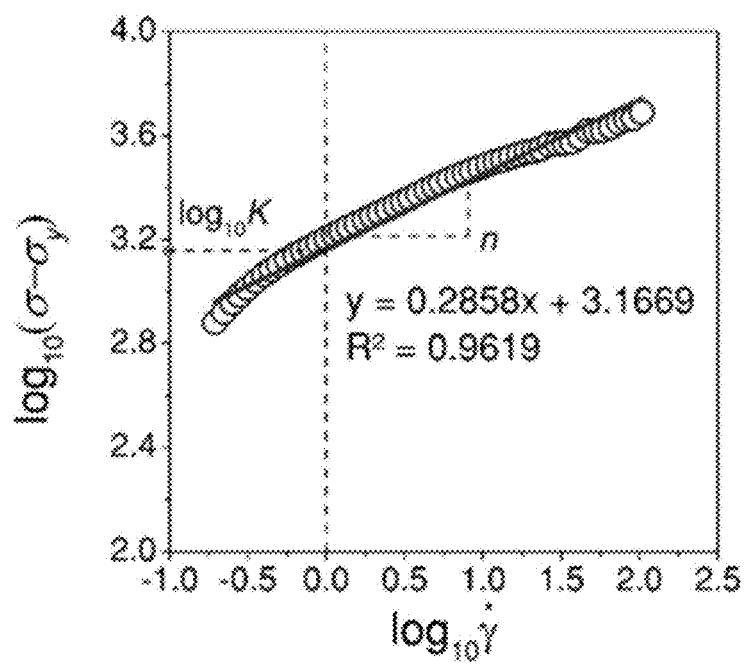
FIG. 5B is a plot of shear stress (σ)-shear rate (μ̇) measurement of S25 fitted with Herschel-Bulkley (HB) model on a log-log scale.

It is desirable that the printing ink possesses shear thinning properties to dispense the inks at low pressure in DIW 3D printing. It is herein shown that the formulated chocolate-based inks exhibited shear-thinning flow behaviors. The behaviors of the ink was approximated by the Herschel-Bulkley (HB) model:

$$\sigma=\sigma_y+K\dot{\gamma}n \qquad (1)$$

$$\log_{10}(\sigma-\sigma_y)=\log_{10}K+n\log_{10}\dot{\gamma} \qquad (2)$$

where K is the flow consistency index (a measure of the viscosity of the fluid in Pa·s"), and n is the shear-thinning index (n=1 for Newtonian fluids, n<1 for shear-thinning fluids and n>1 for shear-thickening fluids). The values of K and n were determined by plotting ($\sigma-\sigma_y$) with respect to $\dot{\gamma}$ on the logarithmic axes and fitting a straight line in the form of equation (2) (FIGS. 5A and 5B). The HB model provided a fit with $R^2$>0.95 for all inks tested in the experiment. The calculated values of K and n are shown (FIG. 3C). For the cake icing, the value of n was 0.4, confirming the shear-thinning property. With addition of cocoa powder in syrup, n decreased from 0.7 (S15) to 0.3 (S25) as the cocoa concentration was increased (FIG. 3C, solid circles). For the inks based on the chocolate paste, slight increase in n from 0.5 (P0) to 0.6 (P12) was observed as the cocoa concentration was increased. The lower n suggested the higher degree of shear-thinning of the ink. The value of K increased as the cocoa concentration increased for both syrup and paste.

Overall, the high values of K for the chocolate-based inks suggested improved mechanical strength to retain shapes after being dispensed from the nozzle.

Figure 3D:
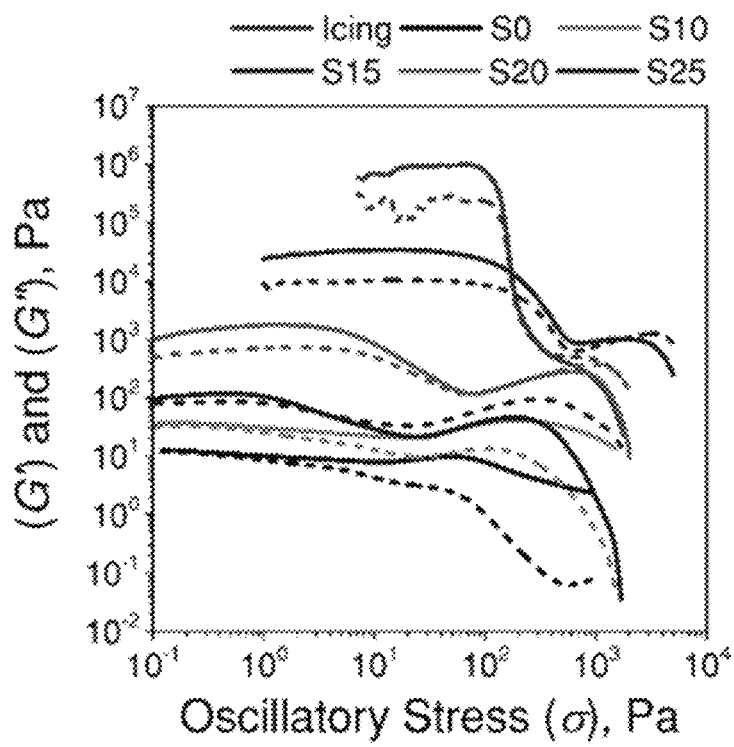
FIG. 3D demonstrates for rheological characterization of syrup (S0), syrup with cocoa powder (S10 to S25), paste (P0), paste with cocoa powder (P5 to P12) and cake icing.
Figure 6A:
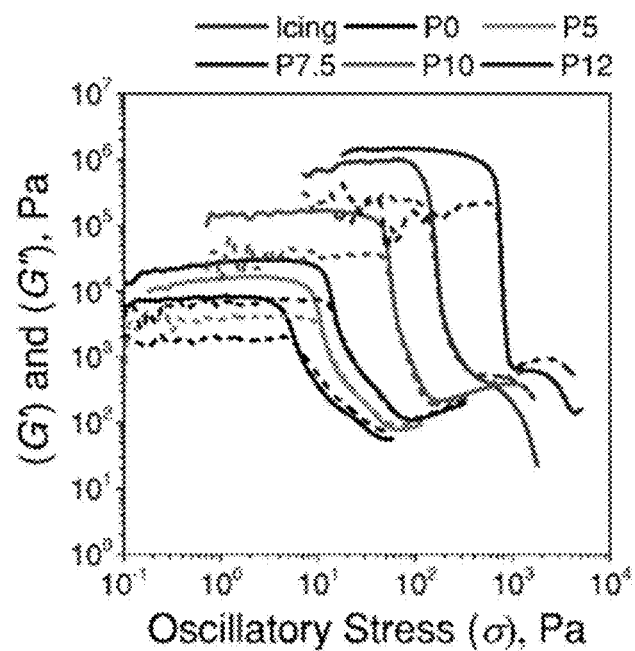
FIG. 6A demonstrates for oscillatory stress measurements of chocolate-based inks and cake icing.
Figure 6B:
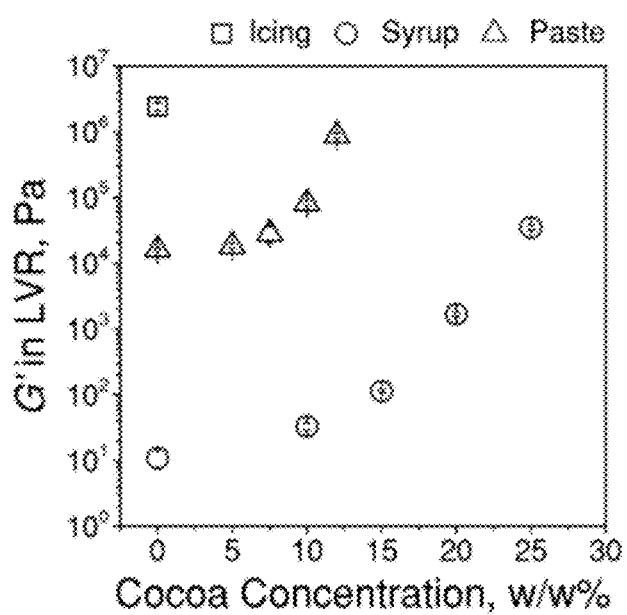
FIG. 6B demonstrates for oscillatory stress measurements of chocolate-based inks and cake icing.

The oscillatory amplitude sweep tests were performed to study the viscoelastic properties of the printing inks (FIG. 3D and FIG. 6A). Oscillatory amplitude sweep tests provided details of the microstructure of the inks. The response of storage modulus (G', a measure of elastic response of the ink) and loss modulus (G", a measure of viscous response of the ink) with applied sinusoidal oscillatory shear was observed. Further, oscillatory stress sweeps were used to analyze the yield behavior of the inks. At low shear stress, G' for all the inks remained constant, and a linear viscoelastic region (LVR) was observed (except for S0 and S10 which showed liquid-like behaviors, which were not suitable to fabricate 3D models). In this region, the internal structure of the inks remained unchanged or undamaged due to their elastic behavior. The solid-like behavior of the inks in LVR was confirmed for the condition of G'>G". G' in LVR gradually increased with increasing concentration of cocoa powder in the inks, suggesting the presence of strong interactions between the colloidal particles (FIG. 6B). For the inks formulated with the syrup, G' increased by five orders from S0 to S25. For the inks formulated with paste, the general behaviors were the same as those with the syrup, wherein G' ranged from $10^4$ Pa (P0) to $10^6$ Pa (P12). The broad LVR of the inks with high concentrations of cocoa powders (S20, S25, P10 and P12) indicated high resistance to the applied stresses to maintain the structures (FIG. 6B). These inks withstood applied oscillatory stress of $10^1$ to $10^2$ Pa before the structure breakdown occurred.

Figure 6C:
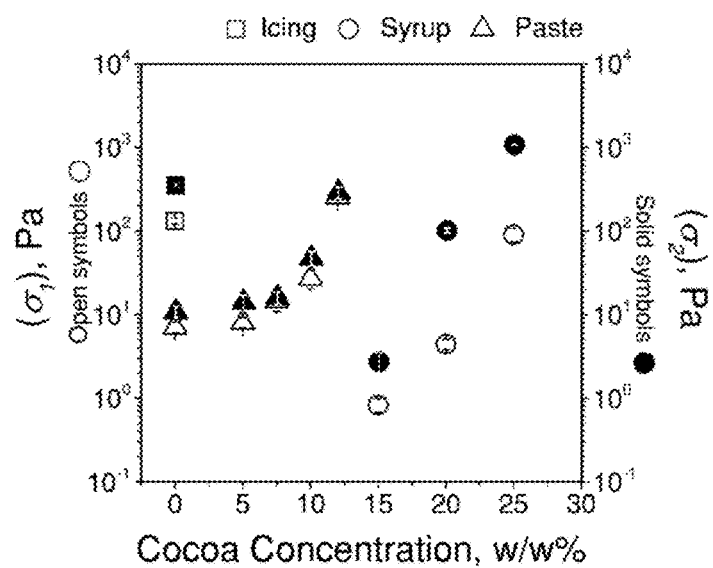
FIG. 6C demonstrates for oscillatory stress measurements of chocolate-based inks and cake icing.
Figure 6D:
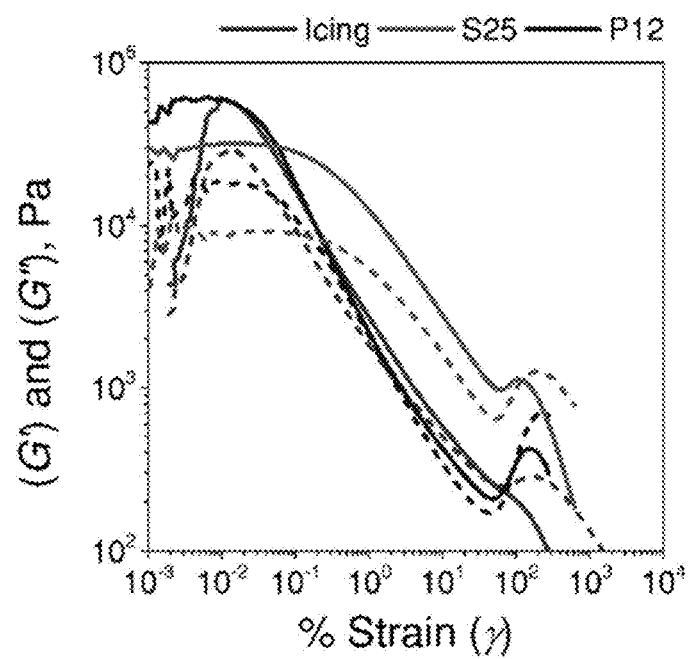
FIG. 6D demonstrates for oscillatory stress measurements of chocolate-based inks and cake icing.

The gradual decrease in G' indicated collapse of the ink structure and subsequent breakdown resulting in liquid-like behaviors. To gain insights into the liquid-like and solid-like behaviors of the inks, yield stress was estimated by two ways: (1) deviation of G' from LVR, measuring the yield point ($\sigma_1$) that indicated the onset of fall in the value of G', and (2) crossover of G' and G", measuring the yield point ($\sigma_2$) that indicated the transition from solid-like to liquid-like behaviors (FIG. 6C). $\sigma_1$ was determined from the intersection of two lines: one fitted to the values in the LVR and another fitted to G' beyond the LVR. As expected, cake icing exhibited large values of $\sigma_1$=132±10 Pa and $\sigma_2$ 11=353±25 Pa. Based on the measured values of $\sigma_1$ and $\sigma_2$, the unmodified syrup (S0) was more liquid-like than the unmodified paste (P0) (FIG. 6C). The values of $\sigma_1$ and $\sigma_2$ increased with increasing concentration of cocoa (FIG. 6C). The difference in the values of $\sigma_1$ and $\sigma_2$ was less for the inks based on the paste than those based on the syrup, suggesting fast solid-liquid transition. Both G' and G" of the rheology-modified syrups and pastes exhibited overshoots and following decreases at intermediate strain amplitude (FIG. 6D). This observation suggested Type IV (strong strain overshoot) large amplitude oscillatory shear (LAOS) behavior, a characteristic of strong intermolecular interactions of the network microstructure. For cake icing, only G" showed an overshoot at intermediate strain amplitude followed by decreasing values suggesting Type III (weak strain overshoot) LAOS behavior (FIG. 6D). Such behaviors may be attributed to a transition from an ordered structure to a disordered structure (i.e. breakdown of the microstructures) that occurs during shearing of the suspensions. Further investigation may be needed to understand the physical mechanism of the complex behavior of strain overshoot observed for the studied inks.

Figure 7A:
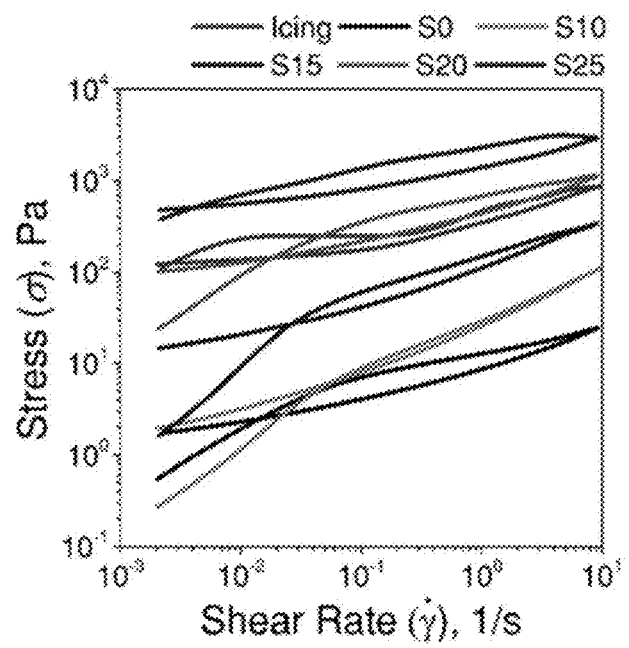
FIG. 7A is a plot showing the results of thixotropic loop test, shear stress (σ) as a function of increasing and decreasing shear rate ($\dot{\gamma}$), for the syrup-based inks and unmodified cake icing.
Figure 7B:
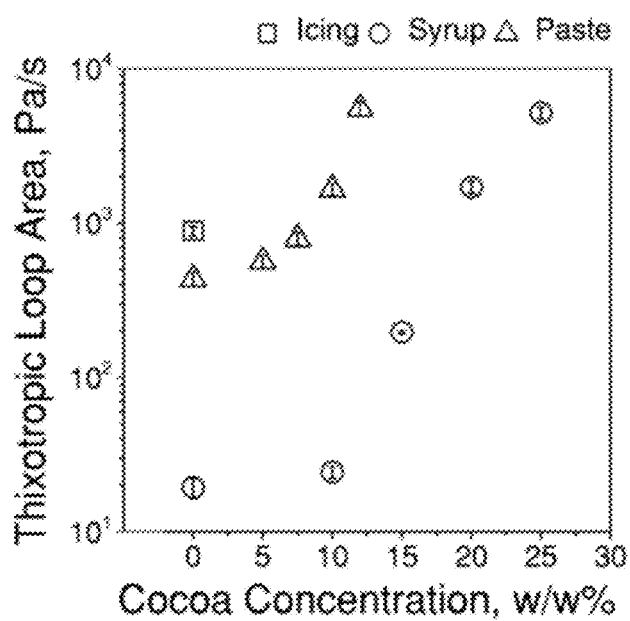
FIG. 7B is a plot of thixotropic loop area as a function of concentration of cocoa powder in syrup (S0 to S25), paste (P0 to P12) and cake icing.

Finally, thixotropic loop tests were carried out to study the time-dependent breakdown and recovery of the microstructure of the printing inks. The results of the experiments are summarized (FIGS. 7A and 7B). It is herein shown that degree of thixotropy increased by the addition of the cocoa powder. The thixotropic loop area increased from S0 (19±3 Pa/s) to S25 (5186±462 Pa/s) for the syrup, and P0 (435±47 Pa/s) to P25 (5531±562 Pa/s) for the paste, respectively (FIG. 7B). Similarly, thixotropic loop area of cake icing was measured to be 889±65 Pa/s. These measurements suggested that the syrup and the paste acquired characteristics of a thixotropic fluid by the addition of cocoa powders.

Overall, the rheological properties of the chocolate-based inks by the addition of the cocoa powders were studied. The ink for DIW 3D printing should, for example, be shear-thinning for the ease of dispensing and possess high $\sigma_y$ and G' to retain the resolution of the printed structures without spreading. Overall, the values of $\sigma_y$ and G' for successful DIW 3D printing may be inks with $\sigma_y$~$10^2$ to $10^3$ Pa and G' ~$10^3$ to $10^4$ Pa resulted in good fidelity of printing. The fidelity of printing was not confirmed by previously reported rheological characterization of the printing inks. For example, in a study, it was reported that the ink with $\sigma_y$=60 Pa and G'=500 Pa was able to retain the printed shape after extrusion. Two cases were reported for the failure of printing, wherein the ink with $\sigma_y$=100 Pa and G'=36000 Pa experienced difficulty of extrusion though the nozzle, and the ink with $\sigma_y$=8 Pa and G' of 300 Pa may not retain the printed shape. By comparing the values of $\sigma_y$ and G' of the chocolate-based inks to that of reported values, S20, S25, P10 and P12 herein appeared to be suitable inks for the present Ci3DP. It is also noted that the formulated chocolate-based ink possessed similar rheological properties to cake icing, a material known to form self-supporting 3D structures.

Example 10B: Discussion—Thixotropic Loop Test

The thixotropic loop test consisted of two parts, an upward curve (first part) and a downward curve (second part). The effect of increased shear rate (first part) followed by decreased shear rate (second part) on shear stress was observed, wherein the shear rate was increased from 0.0001 to 10 $s^{-1}$ and then decreased from 10 to 0.0001 $s^{-1}$ (FIG. 7A). The shear stress increased with increasing applied shear rate due to the elastic response of the inks. As the shear rate was increased, the breakdown of the structures of the inks led the transition of the ink properties from elastic to viscous. The breakdown of the structures of the inks can be confirmed by the relative positions of the curves, wherein the downward curve was located under the upward curve. As the shear rate was decreased, the recovery of the broken structures of the inks started. To evaluate the thixotropy, the inbound area between the upward and downward curve was measured, wherein the inbound area measures the energy required to break down the ink structure.

Example 11: Discussion—Flow of Ink Through Nozzle

Figure 8A:
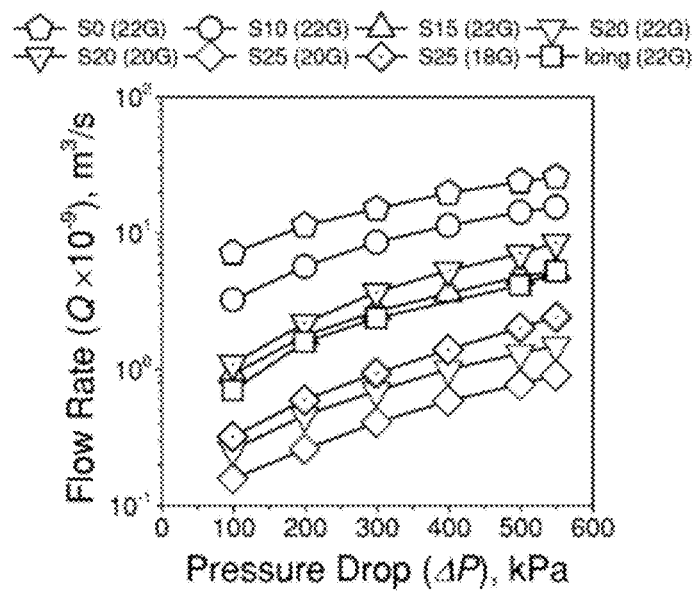
FIG. 8A is a plot showing the rate of volumetric flow rate (Q) as a function of the pressure drop (ΔP) for syrup-based inks (S0 to S25) and cake icing.
Figure 8B:
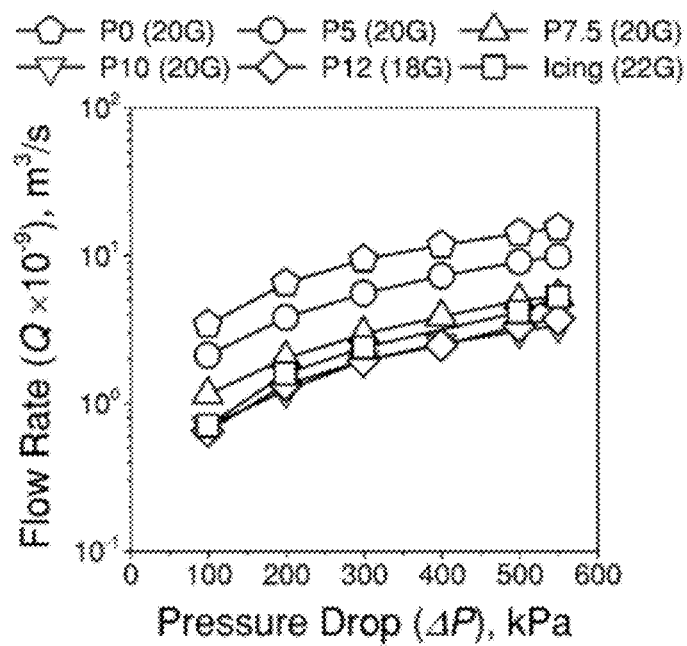
FIG. 8B is a plot showing the rate of volumetric flow rate (Q) as a function of the pressure drop (ΔP) for paste-based inks (P0 to P12) and cake icing.
Figure 9:
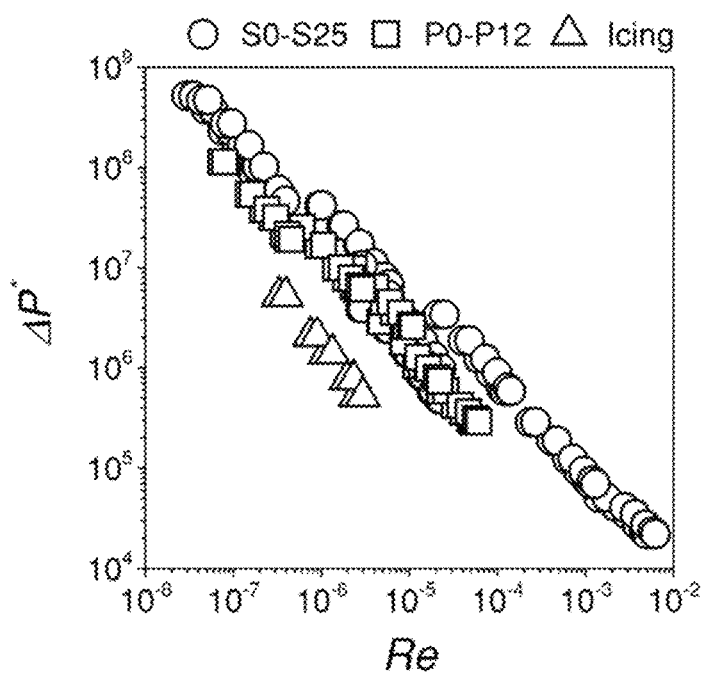
FIG. 9 is a plot showing the dimensionless pressure drop (ΔP*) as a function of Reynolds number (Re) for inks based on chocolate syrups (S0 to S25), inks based on chocolate pastes (P0 to P12) and cake icing. General-purpose nozzles of sizes d=410, 600 and 810 μm were used.

The chocolate-based ink was extruded through the nozzle under an applied pressure ($\Delta P=P-P_{atm}$) in the present Ci3DP method. The extrusion of the inks through the nozzles influenced the process-related rheological properties, wherein the process-related $\mu$ is lower than $\mu$ measured by rheometry. It was therefore important to estimate the ink properties from the measurements relevant to the actual process. First, the relationship between the rate of volumetric flow of the inks (Q) and $\Delta P$ was quantified for S0 to S25, P0 to P12 and cake icing with the nozzles of d=410 to 840 µm (22 to 18 Gauges) for ΔP=100 to 550 kPa. The measurements confirmed that, for the given ink, Q increased nonlinearly with increasing ΔP and with increasing d (FIGS. 8A and 8B). The high concentration of the cocoa powder resulted in high µ and hence low Q. The trends observed in the plots of Q as a function of ΔP allowed to estimate the required pressure to achieve adequate flow rate to model 3D structures by Ci3DP. Two dimensionless groups were used to characterize the flow of the inks through the nozzle: the Reynolds number (Re), $$Re = \frac{\rho v_i d}{\mu} \quad (3)$$

and the dimensionless pressure drop (ΔP*)

$$\Delta P^* = \frac{\Delta P}{\rho v_i^2 / 2} \quad (4)$$

where d, ρ and $v_i$ are the diameter of the nozzle, the density of the ink and the average velocity of the ink through the nozzle, respectively. The plot of ΔP* against Re for all the inks exhibited similar linear trends with some scatter (FIG. 9). ΔP* decreased inversely with Re, and this observation suggested the characteristic viscous-dominated flow, where viscous effects dominate over inertial effects of chocolate-based inks at small Re (Re<1).

Example 12: Influence of Types of Nozzles on Q of Inks

Figure 10A:
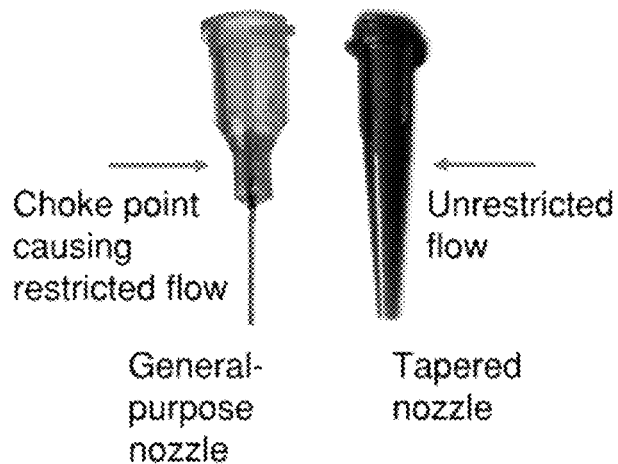
FIG. 10A depicts the types of nozzles used in the present Ci3DP method.
Figure 10B:
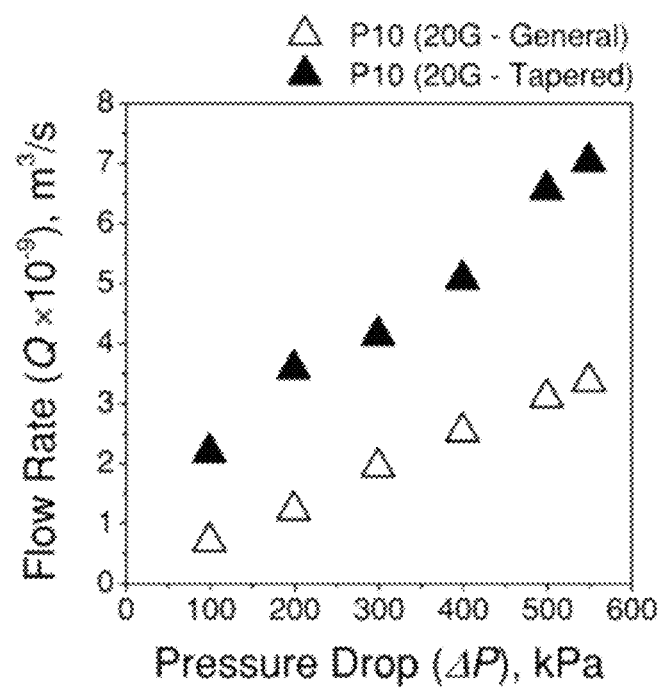
FIG. 10B is a plot showing volumetric flow rate (Q) as a function of pressure drop (ΔP) through a general-purpose nozzle (20 Gauge, d=600 μm) and a tapered nozzle (20 Gauge, d=600 μm) for P10.

Two types of nozzles in demonstrated for the present Ci3DP method, a general-purpose nozzle and a tapered nozzle (FIG. 10A). The resistance of a tapered nozzle was lower than that of a general-purpose nozzle with the same diameter of the outlet, wherein a general-purpose nozzle has a choke point that prevents or lowers the flow of viscous inks. The nozzles with d=600 µm (at the exit area) were compared, wherein P10 was dispensed for ΔP=100 to 550 kPa and Q measured Q (FIG. 10B). For a given ΔP, Q of the ink in a tapered nozzle was larger by 2 to 3 times that the values of Q in a general-purpose nozzle with the same inner diameter of the outlet. For a general-purpose nozzle, more than 90% of the total pressure drop occurs in the last 40% of the length of the nozzle. In contrast, for a tapered nozzle, more than 90% of the total pressure drop occurs in less than the last 20% of the length of the nozzle. The use of tapered nozzle ensured a smooth flow of the ink, and lowered the required pressure applied by the dispenser for the high viscous inks such as S25 and P12. While ΔP may be the printing parameter most convenient to vary Q, the change in the nozzle type (e.g. a general-purpose nozzle or a tapered nozzle) also allowed to vary Q for a fixed value of ΔP. In practice, the use of tapered nozzles may be preferred for printing at low pressure.

Example 13: Spreading of Printed Inks

Figure 11A:
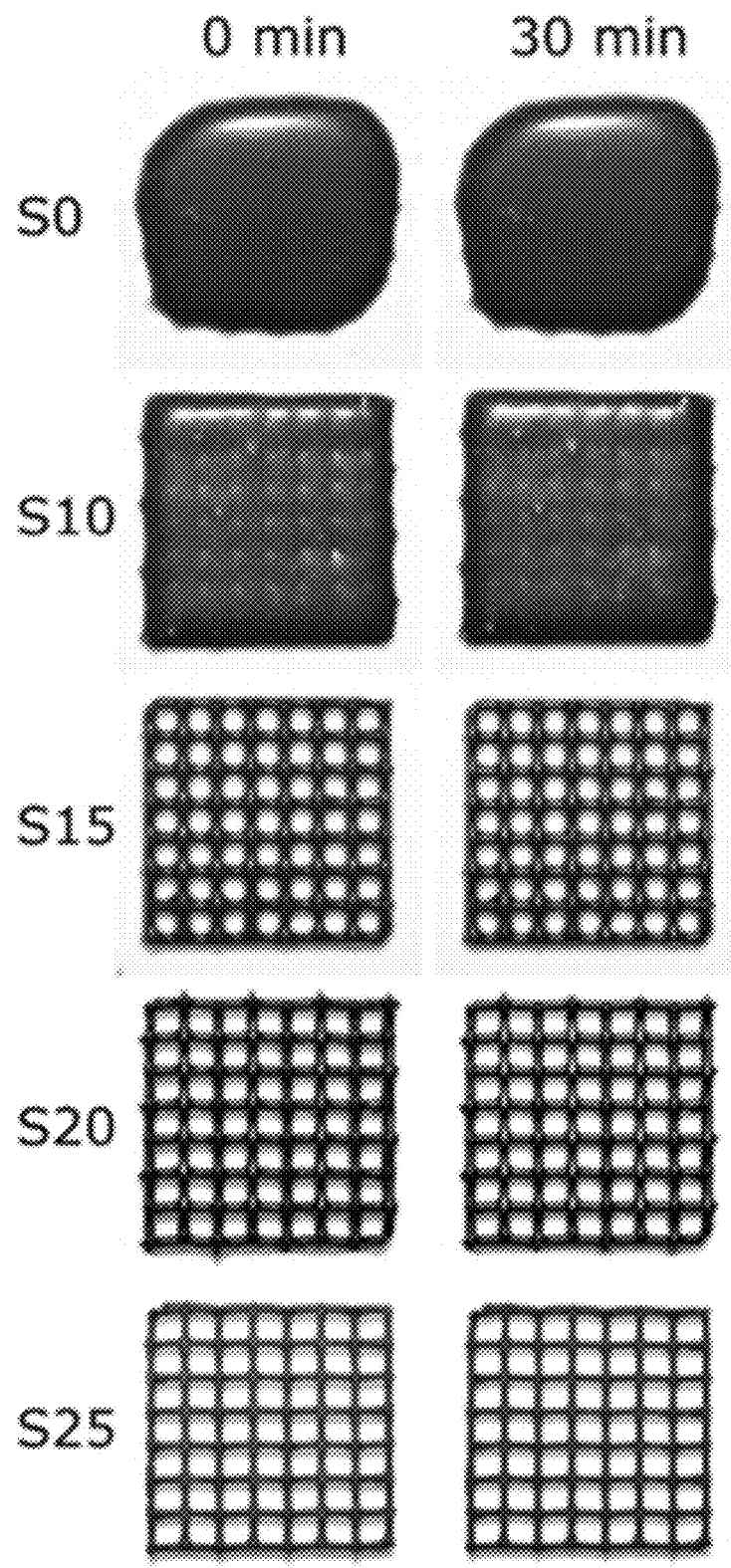
FIG. 11A demonstrates for the effect of concentration of cocoa in the chocolate-based inks on the fidelity of printing, highlighting the spreading of the inks. The 3D meshes (4 cm×4 cm, 4 layers) consisting of chocolate-based materials were printed.
Figure 11B:
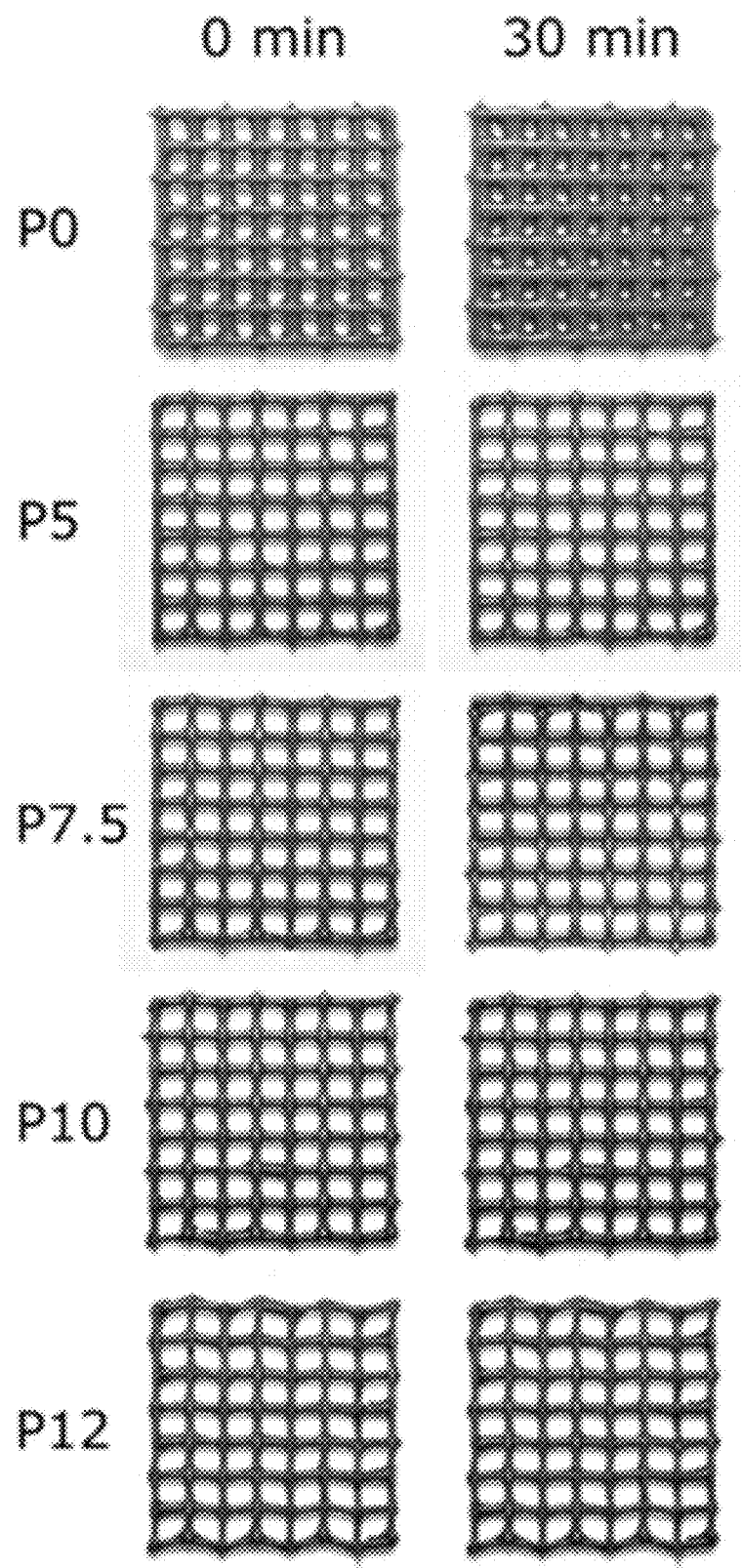
FIG. 11B demonstrates for the effect of concentration of cocoa in the chocolate-based inks on the fidelity of printing, highlighting the spreading of the inks. The 3D meshes (4 cm×4 cm, 4 layers) consisting of chocolate-based materials were printed.
Figure 11C:
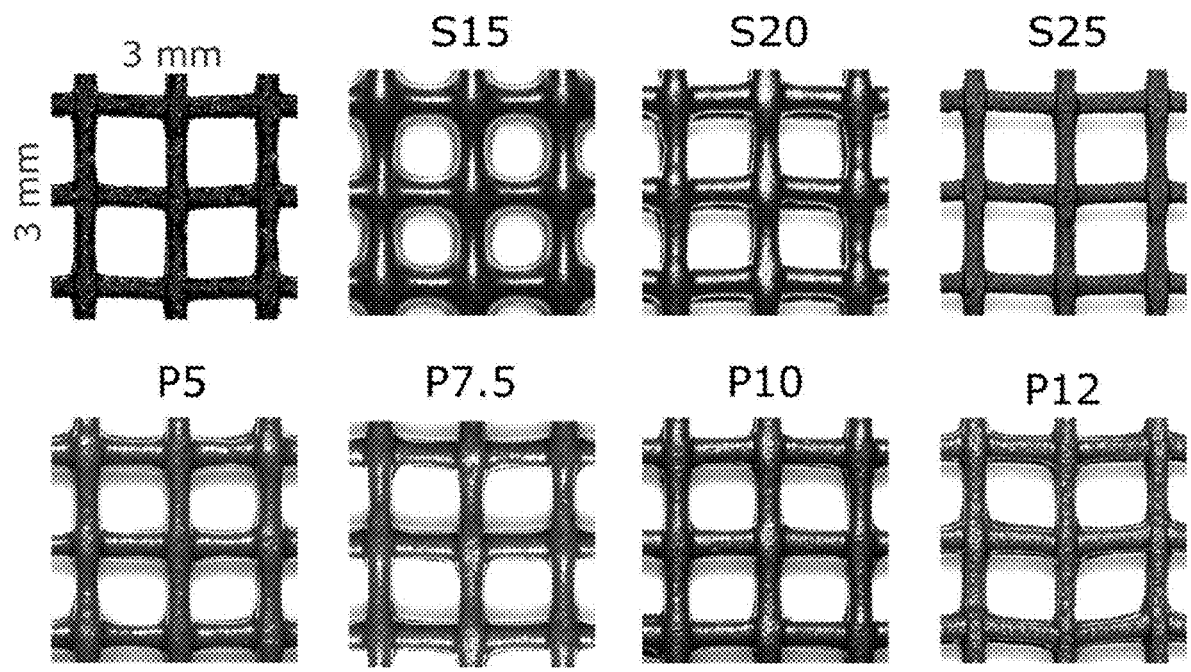
FIG. 11C is an optical micrograph of the 3D mesh models fabricated with the syrup-based inks (S15 to S25) and paste-based inks (P5 to P12) at $t_p$=30 min (time after printing).

The printed structure may be affected due to spreading of the inks at time $t_p$, where $t_p$ is the time after printing. Spreading of the ink may be pronounced for the inks with low yield stress ($\sigma_y$). This problem was highlighted for printing a 3D mesh (4 cm×4 cm) with four layers of chocolate-based inks based on the syrups (S0 to S25) (FIG. 11A) and those based on the pastes (P0 to P12) (FIG. 11B). It is observed that the printed S0, S10 and S15 started spreading immediately while printing. $\sigma_y$ (2 to 23 Pa for S0 to S15) and G' (113±7 Pa for S15) of the ink were not sufficiently high, and the printed structure yielded to the gravity (the magnified images in FIG. 11C). In contrast, S20 ($\sigma_y$=142±5 Pa, and G'=1670±115 Pa) and S25 (σy=277±22 Pa, and G'=35000±3000 Pa) retained the shape of the printed inks for 30 min. The large values of ay and G' for S20 and S25 allowed the inks to form self-supporting layers. Similarly, 3D meshes consisting of four layers of the inks formulated with the chocolate pastes (P0 to P12) were fabricated (FIG. 11B). The values of $\sigma_y$ were slightly higher than those for the inks formulated with syrups. The spreading of the printed inks was observed for P0, wherein the width of the printed ink increased over 30 min. The width of the filament remained nearly constant for P5, P7.5, P10 and P12. Interestingly, the adjacent layers vertically fused at the locations in contact for the models fabricated in P5 and P7.5, while the different layers of the models consisting of P10 and P12 remained disjoint for 30 min after printing (FIG. 11C). These experiments demonstrated for non-Newtonian rheology of the printing inks on the fidelity of printing. Spreading of the printed structures may be avoided by adding large amount of the cocoa powders to the syrup (20 to 25 w/w %) and to the paste (10 to 12 w/w %). The rheology of printing also affected the vertical attachment of different layers, which may be needed for producing the 3D models.

Example 14: Shear-Thinning Inks and Print Fidelity

Figure 12:
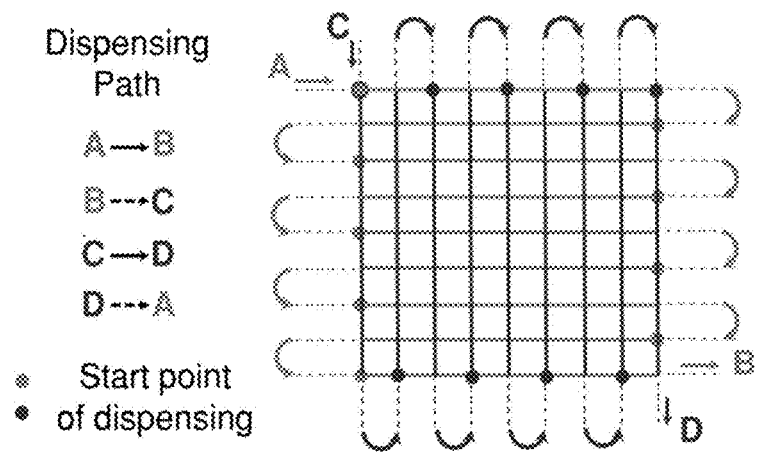
FIG. 12 is a schematic illustration of the paths to fabricate 3D mesh. Along the solid lines, the dispensing pressure was applied, and along the dashed lines, the pressure was not applied. Direction of dispensing of the ink is shown with the arrows. Filled circles indicate the points of the start of dispensing (ΔP>0). The first layer was formed by following the path of dispensing from A to B (lines in green colors). The nozzle then moved from B to C and the second layer was formed by dispensing ink from C to D (lines in red color) with a set value of Δz. 3D mesh was fabricated by alternating these two modes of printing until the desired number of layers of inks was printed.
Figure 13A:
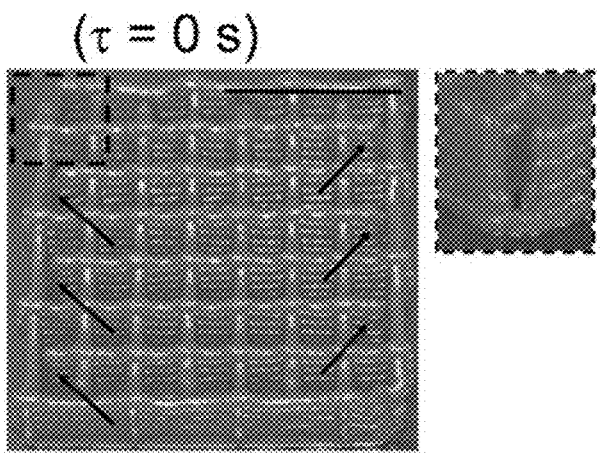
FIG. 13A shows the formation of gaps by printing shear-thinning inks.
Figure 13B:
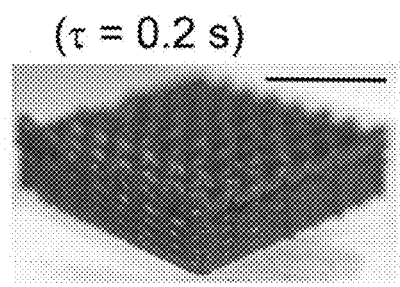
FIG. 13B shows the sealing of gaps. The nozzle was stopped (while P was maintained) for 0.2 s at every point to start dispensing the ink. Scale bar denotes 1 cm.
Figure 13C:
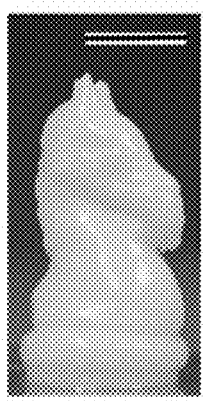
FIG. 13C shows a 3D printed knight of cake icing. Scale bar denotes 1 cm.

The attainable 3D models may also depend on shear-thinning property of the inks. It has been discussed earlier that the chocolate-based inks and cake icing were yield stress and shear-thinning fluids. For such fluids, there are some time lags before the terminal volumetric flow rate (Q) was achieved after a given pressure was applied. These time lags may need to be compensated to attain proper 3D models. In this example, cake icing was used as a model ink to understand the behavior of the printed inks, wherein the same observations may be applicable for other types of chocolate-based inks. The paths to dispense two layers of the mesh are shown (FIG. 12). It is observed the gaps in the printed models at the points where dispensing was started (i.e. the top left corner of the mesh) (FIG. 13A). The attachment of filaments at the corner was compromised and the gaps were formed (FIG. 13A, inset). These gaps formed due to the time lag associated with the dispensing of viscous shear-thinning solution (µ=2×10⁴ Pa·s for cake icing). The ink did not attain the terminal volumetric flow rate (Q) immediately after applying the constant pressure for dispensing, resulting in incomplete sealing at the corners of the model. To compensate for this time lag, the motion of the nozzle was stopped for some time (τ) at every point where the dispensing started (e.g. τ=0.2 used for cake icing). Intended 3D models were obtained with the compensation of time (FIG. 13B). Generally, inks with large values of µ may require the time lag to be considered, such as S20, S25, P10 and P12 (µ~10³ to 10⁴ Pa.s) which required τ=0.2 to 0.5 s to achieve the best print fidelity. In contrast, S0, S10 and S15 did not appear to require such compensation, and τ=0 was used for printing (although the printed models failed due to spreading of the inks). This consideration allowed fabricating relatively complex structures of cake icing at room temperature by DIW, e.g. a 3D object representing a knight was fabricated using cake icing with proper attachment of the printed inks (FIG. 13C).

Example 15: 3D Structures by Ci3DP

Figure 14A:
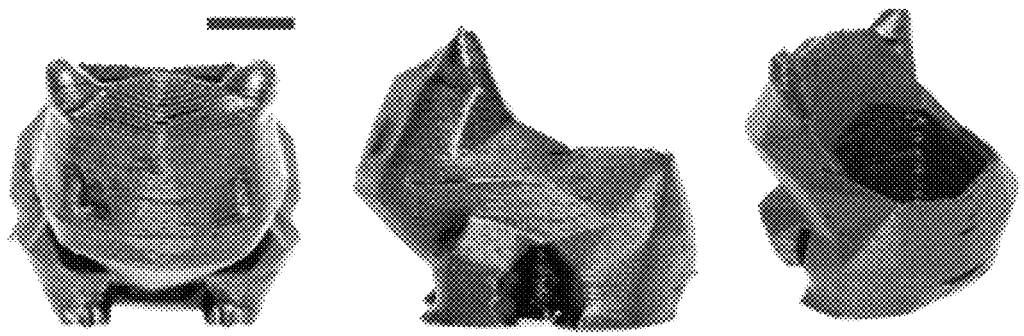
FIG. 14A is an optical image of one of the 3D printed structures printed by direct chocolate-based ink 3D printing, a method of the present disclosure.
Figure 14B:
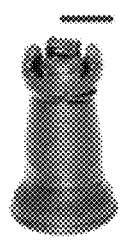
FIG. 14B is an optical image of one of the 3D printed structures printed by direct chocolate-based ink 3D printing, a method of the present disclosure.
Figure 14C:
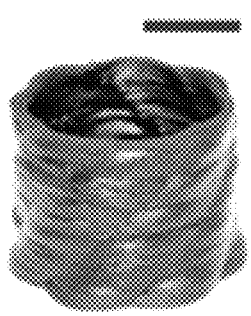
FIG. 14C is an optical image of one of the 3D printed structures printed by direct chocolate-based ink 3D printing, a method of the present disclosure.
Figure 14D:
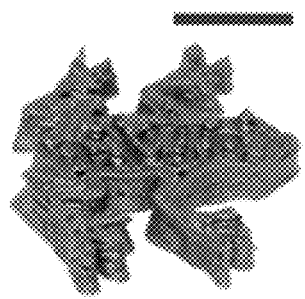
FIG. 14D is an optical image of one of the 3D printed structures printed by direct chocolate-based ink 3D printing, a method of the present disclosure.
Figure 14E:
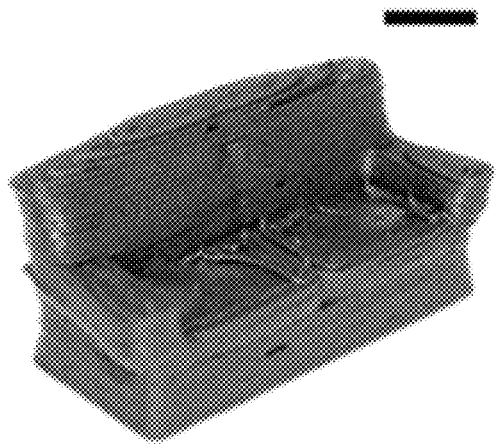
FIG. 14E is an optical image of one of the 3D printed structures printed by direct chocolate-based ink 3D printing, a method of the present disclosure.
Figure 14F:
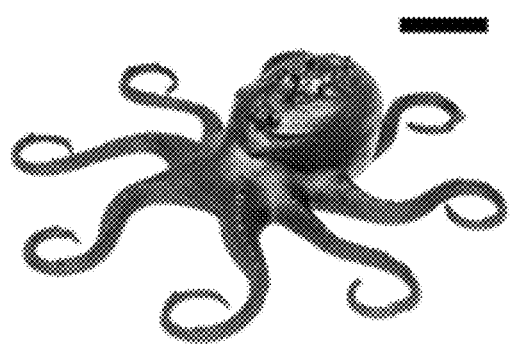
FIG. 14F is an optical image of one of the 3D printed structures printed by direct chocolate-based ink 3D printing, a method of the present disclosure.
Figure 14G:
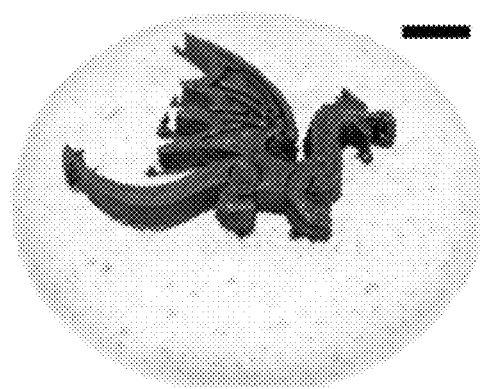
FIG. 14G shows a 3D structure, printed with S20, of dragon directly printed on a biscuit as an underlying substrate. Scale bar denotes 1 cm.
Figure 15A:
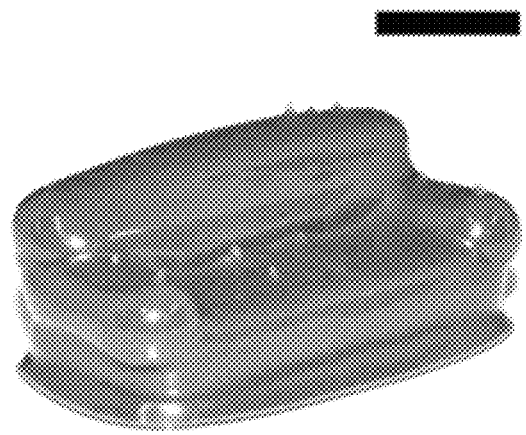
FIG. 15A shows an optical image of a 3D structure consisting of paste-based inks printed by the present Ci3DP method, wherein the 3D structure is based on P7.5. Scale bar denotes 1 cm.
Figure 15B:
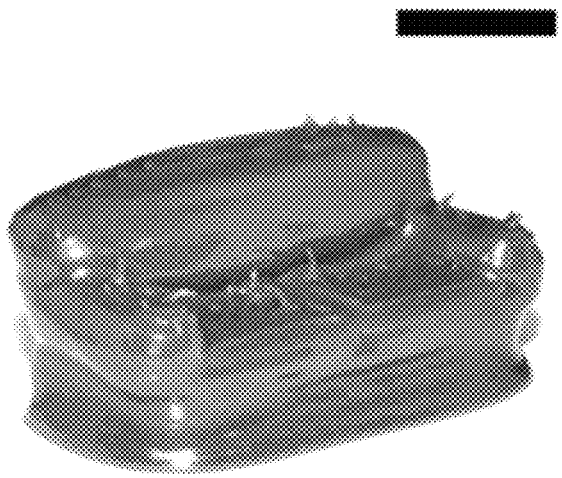
FIG. 15B shows an optical image of a 3D structure consisting of paste-based inks printed by the present Ci3DP method, wherein the 3D structure is based on P10. Scale bar denotes 1 cm.
Figure 15C:
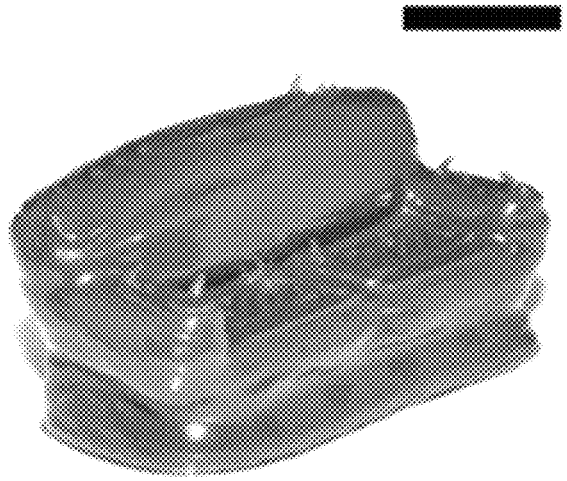
FIG. 15C shows an optical image of a 3D structure consisting of paste-based inks printed by the present Ci3DP method, wherein the 3D structure is based on P12. Scale bar denotes 1 cm.

With appropriate printing inks and operating parameters, fabrication of 3D models consisting of chocolate-based materials were demonstrated. The fabricated 3D structures of S20 to S25 are showcased (FIG. 14A to 14G). These demonstrations highlighted the advantages of addition of cocoa powder to the inks in terms of (1) viscosity of the printing ink (ranging from $10^2$ to $10^4$ Pa.s) and (2) alteration of ink behavior from liquid-like to solid-like with yield stress. Unlike the hot-melt extrusion of chocolate 3D printing, all demonstrations in the present disclosure was done at room temperature without any heating elements. A Bulbasaur with a big cavity at the back was printed (front, side and top views in FIG. 14A). Different 3D geometries were directly fabricated (FIG. 14B to 14F) on the glass substrate. Using appropriate calibrations performed in the z-direction, Ci3DP on another edible substrate (e.g. a biscuit) was also performed (FIG. 14G). In the same way, 3D models consisting of P7.5 to P12 were printed (FIG. 15A to 15C). Overall, cocoa powders was used as an additive to modify the rheological properties of chocolate syrups and pastes. Characterization of their rheological properties ensured that the inks were appropriate to form self-supporting layers to form 3D structures. Other materials with long polymer chains (such as starch and other carbohydrate derivatives) may serve as an effective additive for the formation of printable inks.

Example 16: Multi-Material Ci3DP

Figure 16A:
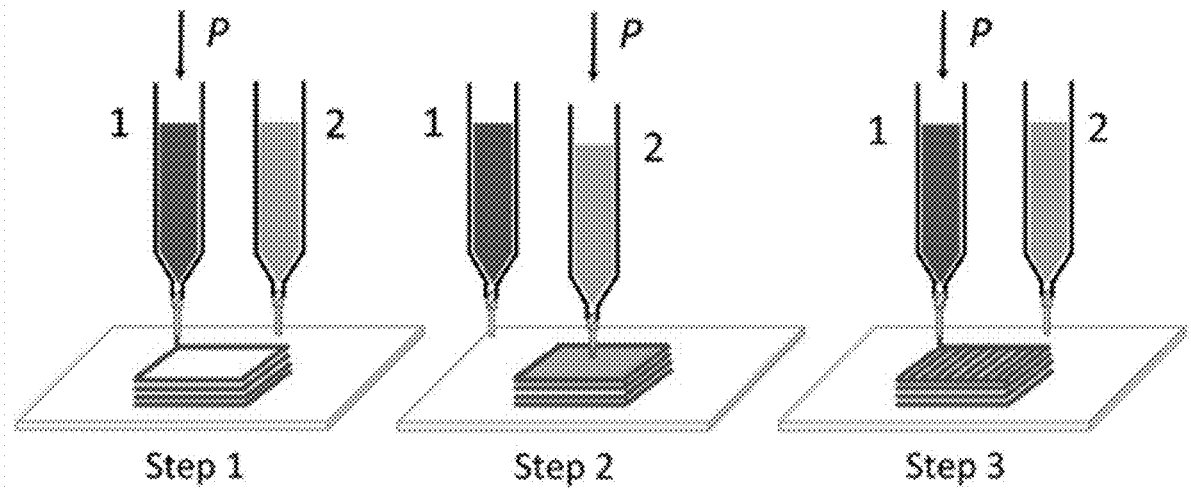
FIG. 16A demonstrates for multi-material food via the present Ci3DP method.
Figure 16B:
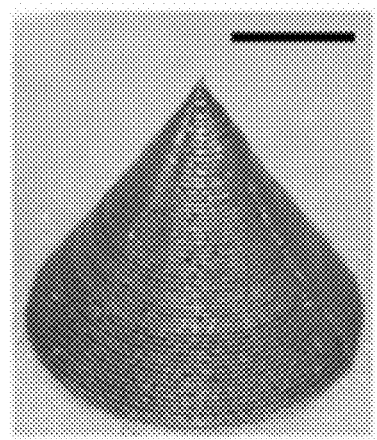
FIG. 16B demonstrates for multi-material food via the present Ci3DP method.
Figure 16C:
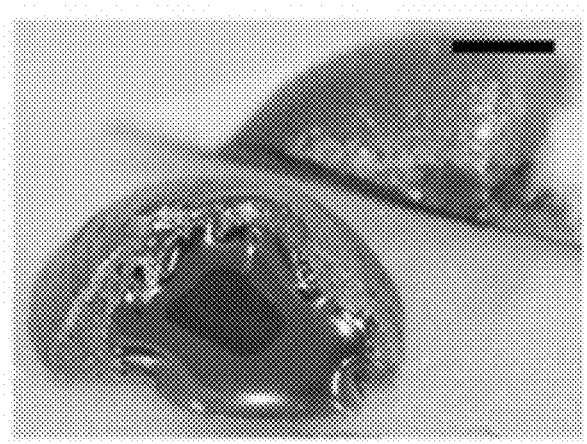
FIG. 16C demonstrates for multi-material food via the present Ci3DP method.

The present disclosure also demonstrates for multi-material printing using the present Ci3DP method, involving a DIW 3D printer equipped with two dispensing syringes (i.e. D1 and D2). A 3D cone-shaped structure was fabricated, containing the liquid chocolate syrup as filling (FIG. 16A to 16C). FIG. 16A illustrates the steps to fabricate a 3D structure with filling. Briefly, a 3D cone-shaped enclosure was fabricated using one dispenser (D1), and the empty space within the 3D enclosure was filled with a chocolate syrup using another dispenser (D2). Finally, the remaining portion of the 3D enclosure was fabricated using D1. The final structure contained a liquid chocolate syrup as a filling (FIG. 16B). The inside filling may be observed once the enclosure was cut in two pieces (FIG. 16C). In this demonstration, it is shown that the present Ci3DP method can be readily extended to multi-material food printing. This work enabled simple control over the rheological properties of the chocolate-based inks, wherein two inks possessed different rheological properties at room temperature. The simplicity to prepare printable inks and fabrication of 3D structures at room temperature makes Ci3DP a unique method to perform multi-material food printing. Multi-material food objects consisting of range of liquid materials as fillings such as milk-based products (e.g. cream and yogurt) may be fabricated in a sequential manner using multiple dispensers. The present Ci3DP method may be readily extended to fabricate multi-material food object with higher complexity and self-supporting properties conferred by the properties of the printing ink.

Example 17: Commercial and Potential Applications

In the present disclosure, a simple method of direct ink writing (DIW) to fabricate complex 3D structures using chocolate-based materials at room temperature is introduced. The process may be termed herein a chocolate-based ink 3D printing (Ci3DP) to highlight formulation of edible inks with adequate rheological properties for DIW. The presently formulated liquid inks consisted of chocolate-based materials (syrups and/or pastes) with different concentrations of cocoa powder. The characteristics of the chocolate-based ink were altered from a liquid-like fluid to a solid-like with zero-shear yield stress. The chocolate-based inks were shear-thinning and capable of forming self-supporting layers at room temperature. The present method advantageously bypassed a requirement of temperature control to perform 3D printing of chocolates by hot-melt extrusion. The present Ci3DP method offered an easy route to fabricate 3D structures of chocolate-based inks with liquid fillings using multiple dispensers. The present Ci3DP method is flexible and may be capable of fabricating customized food based on a wide range of materials with tailored texture and nutritional content. The effect of adding varying concentrations of cocoa powders in chocolate-based inks on the textural, nutritional and sensorial properties can be studied with the present method. This approach offers an alternative route of 3D modeling of food, especially when food ingredients or additives are sensitive to temperature. The use of multiple nozzles may offer interesting avenues to control distribution of the materials within the printed structure and may find applications in the design of texture and controlled release of nutrients.

While the present disclosure has been particularly shown and described with reference to specific embodiments, it may be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. An edible and 3D printable ink composition comprising:
   a chocolate-based material comprising a chocolate syrup, a chocolate paste, or a combination thereof; and
   cocoa powder present in the chocolate-based material in an amount ranging from 5 to 25 w/w %,
   wherein the edible and 3D printable ink composition is both printable and remains in a single phase at a temperature ranging from 20° C. to 30° C.

2. The edible and 3D printable ink composition of claim 1, wherein the cocoa powder is present in the chocolate-based material in an amount ranging from 10 to 25 w/w %.

3. The edible and 3D printable ink composition of claim 1, wherein the chocolate-based material is the chocolate syrup and the cocoa powder is present in the chocolate-based material in an amount ranging from 20 to 25 w/w %.

4. The edible and 3D printable ink composition of claim 1, wherein the chocolate-based material is the chocolate paste and the cocoa powder is present in the chocolate-based material in an amount ranging from 10 to 12 w/w %.

5. The edible and 3D printable ink composition of claim 1, wherein the edible and 3D printable ink composition is a thixotropic fluid.

6. The edible and 3D printable ink composition of claim 1, wherein the edible and 3D printable ink composition has:
   a flow consistency index ranging from more than 0 Pa s$^n$ to 25 Pa s$^n$, wherein n denotes a shear-thinning index ranging from more than 0 to less than 1;

a yield stress ranging from 2 Pa to 300 Pa; and a storage modulus ranging from 10 Pa to 1 MPa.

7. The edible and 3D printable ink composition of claim 1, further comprising a milk-based product, wherein the milk-based product comprises cream, yogurt, or a combination thereof.

8. A method of 3D printing an edible and 3D printable ink composition, wherein the edible and 3D printable ink composition comprises:

a chocolate-based material comprising a chocolate syrup, a chocolate paste, or a combination thereof; and cocoa powder present in the chocolate-based material in an amount ranging from 5 to 25 w/w %, wherein the edible and 3D printable ink composition is both printable and remains in a single phase at a temperature ranging from 20° C. to 30° C., the method comprising:

providing the edible and 3D printable ink composition; and dispensing the edible and 3D printable ink composition onto a substrate at a room temperature ranging from 20° C. to 30° C. and in the absence of temperature control of the edible and 3D printable ink composition.

9. The method of claim 8, wherein providing the edible and 3D printable ink composition comprises filling one or more syringes with the edible and 3D printable ink composition, wherein each of the one or more syringes is configured with a nozzle.

10. The method of claim 9, wherein dispensing the edible and 3D printable ink composition comprises positioning the nozzle at a distance from the edible and 3D printable ink composition which has deposited on the substrate, wherein the distance ranges from 400 μm to 700 μm.

11. The method of claim 9, further comprising maintaining the nozzle at a position with respect to the substrate where dispensing starts so as to compensate for a delay in flow of the edible and 3D printable ink composition from the nozzle to the substrate.

12. The method of claim 8, wherein dispensing the edible and 3D printable ink composition comprises applying a pressure ranging from 100 to 550 kPa to dispense the edible and 3D printable ink composition.

* * * * *